United States Patent [19]
Ohta

[11] Patent Number: 5,991,108
[45] Date of Patent: Nov. 23, 1999

[54] RECORDING AND REPRODUCING APPARATUS

[75] Inventor: Haruo Ohta, Hirakata, Japan

[73] Assignee: Matsushita Electric Industrial Co., Ltd., Osaka-fu, Japan

[21] Appl. No.: 08/804,592

[22] Filed: Feb. 24, 1997

[30] Foreign Application Priority Data

Mar. 8, 1996 [JP] Japan ................................ 8-051767
Dec. 13, 1996 [JP] Japan ................................ 8-334246

[51] Int. Cl.$^6$ ....................................................... G11B 5/09
[52] U.S. Cl. ............................... 360/53; 360/31; 369/48; 369/124; 386/113; 386/114; 386/115
[58] Field of Search ............... 360/31, 53; 386/113–115; 371/71; 369/54, 124, 47–48, 58, 111

[56] References Cited

U.S. PATENT DOCUMENTS 4,331,992  5/1982  Klein et al. ............................ 360/124

FOREIGN PATENT DOCUMENTS 2-198002   8/1990   Japan .
3-34103    2/1991   Japan .
3-232101  10/1991   Japan .
3-286403  12/1991   Japan .

*Primary Examiner*—Artistotelis M. Psitos
*Assistant Examiner*—Dan Davidson
*Attorney, Agent, or Firm*—Panitch Schwarze Jacobs & Nadel, P.C.

[57] ABSTRACT

In a recording and reproducing apparatus having a simultaneous reproducing function, an adaptive filter outputs a pseudo crosstalk signal which approximates to frequency characteristics of crosstalk components leaking from recording data into a reproduced signal, and a subtractor subtracts the pseudo crosstalk signal from the reproduced signal, thereby canceling the crosstalk components

13 Claims, 20 Drawing Sheets

A: Signals 282a and 283a are equal to each other and also signals 282b and 283b are equal to each other B: Signals 282a and 283a are different from each other and also signals 282b and 283b are different from each other C: Other than A and B

RECORDING AND REPRODUCING APPARATUS

BACKGROUND OF THE INVENTION

The present invention relates to a recording and reproducing apparatus having a simultaneous reproducing function in which the reproducing operation is conducted substantially simultaneously with the recording operation.

In the case of a video cassette recorder for a broadcasting station (hereinafter, referred to as "broadcasting VCR"), it is difficult in many cases to conduct the image recording over again. Therefore, a failure in recording must be prevented from occurring. In order to prevent such a failure from occurring, a broadcasting VCR must have a simultaneous reproducing function in which the recording operation and the operation of reproducing the recorded contents are conducted at the substantially same time, thereby enabling the recorded contents to be checked.

When such a simultaneous reproducing function is to be realized, there arises a problem in that, since components such as recording and reproducing heads which are proximately positioned, and recording and reproducing rotary-transformers which respectively transmit a signal to the heads operate simultaneously, crosstalk interference in which a recording signal is mixed into a weak reproduced signal must be suppressed to a level as low as possible. For example, a signal reproduced by a reproducing head is lower in level by about 70 dB than a recording signal supplied to a recording head. In order to prevent crosstalk interference in which a recording signal leaks into a reproduced signal from occurring, when the level allowance of a crosstalk signal with respect to a reproduced signal is −30 dB, recording and reproducing signal levels must be separated from each other by 100 dB or more.

In the prior art, as a technique for suppressing crosstalk interference from a recording signal to a reproduced signal, a method is known in which recording and reproducing rotary-transformers are separately positioned, thereby reducing crosstalk between the rotary-transformers (for example, Japanese Unexamined Patent Publications (Tokkai) Nos. Hei 3-34103, Hei 3-232101, and Hei 3-286403) Moreover, a method is known in which a reproducing head is electromagnetically shielded from a recording head by an electrically conductive stuff or the like (for example, Japanese Unexamined Patent Publication (Tokkai) No. Hei 2-198002).

Recently, there is a demand for a small light broadcasting VCR with the largely reduced size of a rotary cylinder unit. When such a small rotary cylinder unit is used, however, it is difficult to separately position recording and reproducing rotary-transformers or electromagnetically shield a reproducing head from a recording head by an electrically conductive stuff or a magnetic material as in the above-mentioned cases of the prior art. Even if such a countermeasure can be done, the distance between the recording and reproducing heads, the distance between the recording and reproducing rotary-transformers, as well as the distances between wirings for a recording signal and those for a reproduced signal among various portions must be made short, with the result that it is very difficult to separate the recording and reproducing signal levels from each other by 100 dB or more. In the field of the technology therefore, it is a problem to realize a small VCR having a simultaneous reproducing function

BRIEF SUMMARY OF THE INVENTION

It is an object of the present invention to provide a recording and reproducing apparatus of substantially simultaneous reproducing type, in which crosstalk components leaking from the recording signal into the reproduced signal are reduced in level, even with such a small rotary cylinder unit that hitherto could not afford sufficient electromagnetic separation between recording and reproduced signals In order to attain the object, the recording and reproducing apparatus of the present invention comprises:
- a recording head which records a recording signal onto a recording medium;
- a reproducing head which reproduces a recorded signal;
- filter for receiving the recording signal and outputting a pseudo crosstalk signal; and
- operating means for subtracting the pseudo crosstalk signal of the filter from the signal reproduced by the reproducing head.

According to the present invention, therefore, it is possible to obtain a small recording and reproducing apparatus in which the pseudo crosstalk signal is subtracted from the reproduced signal, and hence crosstalk components leaking from the recording signal into the reproduced signal are largely reduced in level, and which has a simultaneous reproducing function.

In the present invention, a pseudo crosstalk signal means a signal having pseudo crosstalk components which are artificially generated.

The recording and reproducing apparatus of the present invention comprises:
- a recording head which records a recording signal onto a magnetic recording medium;
- a reproducing head which reproduces a recorded signal;
- adaptive filter for receiving the recording signal and outputting a pseudo crosstalk signal;
- operating means for subtracting the pseudo crosstalk signal of the adaptive filter from the signal reproduced by the reproducing head; and
- error detecting means for detecting an error signal in accordance with an output signal of the operating means and feeding back the error signal to the adaptive filter.

According to the present invention, therefore, the adaptive filtering means and the error detecting means are disposed, and an adequate pseudo crosstalk signal is always generated, whereby crosstalk components leaking from the recording signal into the reproduced signal can be always optimally eliminated. As a result, even when the condition of crosstalk is changed in accordance with the rotation phase of a rotary cylinder or by changes in properties due to changes in temperature or with ages of the heads and electrical parts, the recording and reproducing apparatus of the present invention can always conduct simultaneous reproduction under the best conditions.

The recording and reproducing apparatus of the present invention comprises:
- a recording head which records a recording data onto a magnetic recording medium;
- a reproducing head which reproduces a recorded signal;
- adaptive filter for receiving the recording signal;
- operating means for subtracting an output of the adaptive filter from the signal reproduced by the reproducing head;
- error detecting means for detecting an error signal from an output signal of the operating means, and feeding back the error signal to the adaptive filter; and
- recovered clock signal generating means for generating a recovered clock signal from the reproduced signal, the recovered clock signal being synchronized with reproduced data, the adaptive filter comprising signal arranging means for outputting K number of continuous recording data (K is a natural number) from a recording data stream as a first data group in synchronization with the recovered clock signal, and outputting K number of other continuous recording data from the recording data stream as a second data group in synchronization with the recovered clock signal;

a first group of multiplying means consisting of K number of multiplying means, the first group of multiplying means receiving K number of data of the second data group as one input, and the error signal as another input;

K number of integrating means for integrating each of output signals of the K number of multiplying means of the first group of multiplying means;

a second group of multiplying means consisting of K number of multiplying means, the second group of multiplying means receiving K number of data of the first data group as one input, and outputs of the K number of integrating means as another input; and operating means for calculating a total sum of outputs of the K number of multiplying means of the second group of multiplying means, and outputting the total sum elf as an output of the adaptive filter.

In the recording and reproducing apparatus of the present invention, therefore, the reproducing operation can be conducted simultaneously with the recording operation in an apparatus of a reduced size.

According to the present invention, even in an apparatus of the type hardly capable of sufficient electromagnetic separation between recording and reproduced signals, such as a small broadcasting VCR with a small size rotary cylinder unit, it is possible to realize a simultaneous reproducing function in which crosstalk components leaking from the recording signal into the reproduced signal are reduced in level.

According to the present invention, even when the phase relationship between recording data and reproduced data is varied by rotation variation of a rotary cylinder or the like, simultaneous reproduction can be conducted without being affected by such variation.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

Hereinafter, specific embodiments of the recording and reproducing apparatus of the present invention will be mentioned with reference to the accompanying drawings.

Embodiment 1

Figure 1:
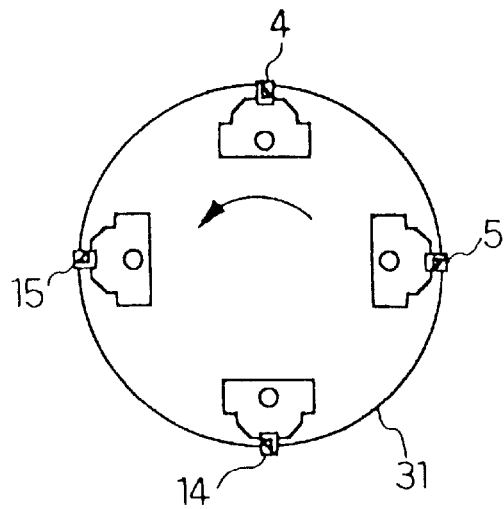
FIG. 1 is a diagram showing the head arrangement of a rotary cylinder of a magnetic recording and reproducing apparatus of Embodiment 1 of the present invention.
Figure 2:
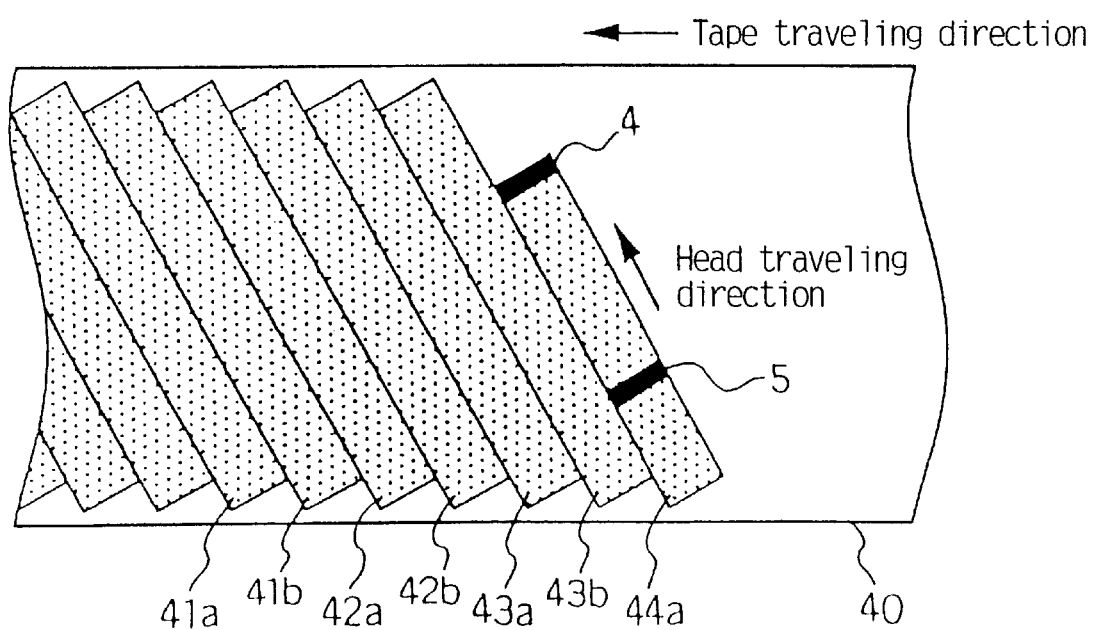
FIG. 2 is a diagram showing relationships between recording tracks on a magnetic tape and the head arrangement in the magnetic recording and reproducing apparatus of Embodiment 1 of the present invention.
Figure 3:
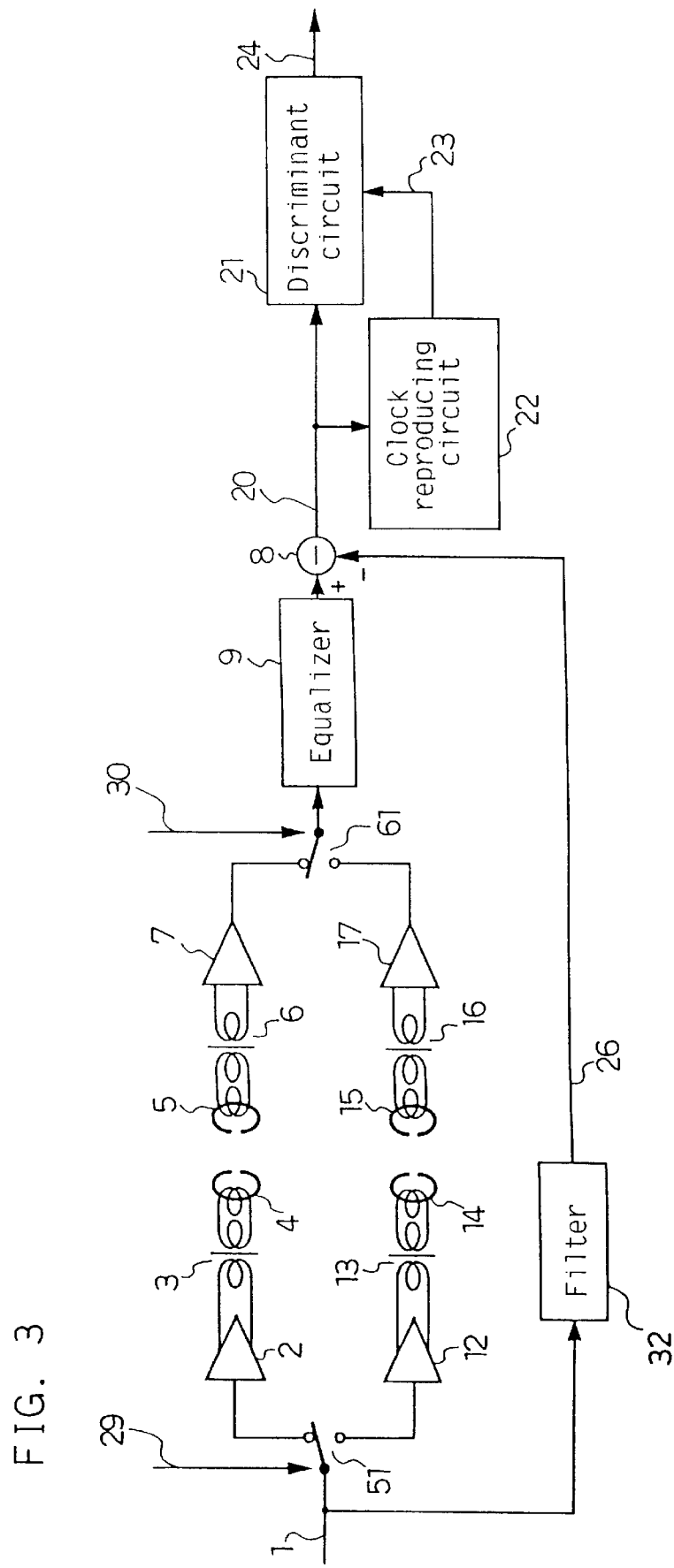
FIG. 3 is a block diagram showing the signal system in the magnetic recording and reproducing apparatus of Embodiment 1 of the present invention.

FIGS. 1 to 3 show a magnetic recording and reproducing apparatus which is Embodiment 1 of the recording and reproducing apparatus of the present invention. In the magnetic recording and reproducing apparatus of Embodiment 1, a pair of recording heads and a pair of reproducing heads are mounted on a small rotary cylinder, and digital data are recorded onto and reproduced from a magnetic tape which is slantly wound on the rotary cylinder and travels thereon.

FIG. 1 is a diagram showing the head arrangement of the rotary cylinder of the magnetic recording and reproducing apparatus of Embodiment 1. Referring to FIG. 1, the rotary cylinder 31 is small in size or has a diameter of about 20 mm, and rotates in a counterclockwise direction as shown in FIG. 1. First and second recording heads 4 and 14, and first and second reproducing heads 5 and 15 are arranged on the rotary cylinder 31. The magnetic tape travels with being slantly wrapped in a zone corresponding to a semicircle (180 degrees) of the rotary cylinder 31.

FIG. 2 is a diagram showing positional relationships among recording tracks on the magnetic tape 40 and the heads. Referring to FIG. 2, plural tracks 41a, 41b, 42a, 42b, 43a, 43b, . . . are slantly formed on the magnetic tape 40. The tracks 41a, 42a, and 43a are tracks which have been already recorded on the magnetic tape 40 by the first recording head 4, and the tracks 41b, 42b, and 43b are tracks which have been already recorded on the magnetic tape 40 by the second recording head 14. As shown in FIG. 2, the track 44a is currently being recorded by the first recording head 4. The first reproducing head 5 traces the track 44a and conducts the reproducing operation at a timing which is slightly later than that of the recording operation on the track by the first recording head 4. Therefore, the magnetic recording and reproducing apparatus of Embodiment 1 can conduct the recording and reproducing operations at the substantially same time, so that the recorded contents can be checked.

Although not illustrated, in the same manner as the case of the first recording and reproducing heads 4 and 5, the tracks 41b, 42b, and 43b which are recorded by the second recording head 14 are subjected to the reproducing operation by the second reproducing head 15 substantially simultaneously with the recording operation.

FIG. 3 is a block diagram showing the signal system in the magnetic recording and reproducing apparatus of Embodiment 1. Referring to FIG. 3, the first and second recording heads 4 and 14 are mounted on the rotary cylinder 31 and alternatingly make contact with the magnetic tape 40 so as to conduct the recording operation thereon as shown in FIG. 1 mentioned above.

A recording signal 1 containing digital data to be recorded is supplied to a recording changeover switch 51 which is controlled by a recording head switch signal 29 synchronized with the rotary cylinder 31. During a period when the first recording head 4 makes contact with the magnetic tape 40, the recording changeover switch 51 is connected to the upper terminal in FIG. 3. In this case, the signal which is to be recorded and is supplied through the recording changeover switch 51 is amplified by a first recording amplifier 2. The signal which is to be recorded and has been amplified is guided to the first recording head 4 on the rotary cylinder 31 through a first recording rotary-transformer 3 and then recorded onto the magnetic tape 40.

During a period when the second recording head 14 makes contact with the magnetic tape 40, the recording changeover switch 51 is connected to the lower terminal in FIG. 3. In this case, the signal which is to be recorded and is supplied through the recording changeover switch 51 is guided to the second recording head 14 on the rotary cylinder 31 through a second recording amplifier 12 and a second recording rotary-transformer 13 and then recorded onto the magnetic tape 40.

As shown in FIG. 1, the first and second reproducing heads 5 and 15 are mounted on the rotary cylinder 31 and alternatingly make contact with the magnetic tape 40 so as to conduct the reproducing operation thereon simultaneously with the above-mentioned recording operation.

A reproducing changeover switch 61 shown in FIG. 3 is controlled by a reproducing head switch signal 30 which is synchronized with the rotary cylinder 31. During a period when the first reproducing head 5 makes contact with the magnetic tape 40, the reproducing changeover switch 61 is connected to the upper terminal in FIG. 3, and, during a period when the second reproducing head 15 makes contact with the magnetic tape 40, connected to the lower terminal in FIG. 3, During a period when the first reproducing head 5 makes contact with the magnetic tape 40, therefore, a signal which has been reproduced by the first reproducing head 5 on the rotary cylinder 31 passes through a first reproducing rotary-transformer 6 and is then amplified by a first reproducing amplifier 7. The amplified signal is supplied to an equalizer 9 through the reproducing changeover switch 61. During a period when the second reproducing head 15 makes contact with the magnetic tape 40, a signal which has been reproduced by the second reproducing head 15 on the rotary cylinder 31 passes through a second reproducing rotary-transformer 16 and is then amplified by a second reproducing amplifier 17. The amplified signal is supplied to the equalizer 9 through the reproducing changeover switch 61.

In the equalizer 9, the frequency characteristics of the system ranging from the recording operation to the reproducing operation are corrected, so that the reproduced signal is equalized in order to enable digital codes to be discriminated. The equalized signal is supplied to a subtractor 8 serving as the operating means.

An equalized signal 20 which is output from the subtractor 8 is supplied to a clock reproducing circuit 22. The clock reproducing circuit 22 outputs a clock signal 23 synchronized with the recorded data. The equalized signal 20 is supplied also to a discriminant circuit 21. The codes of the data are subjected to discrimination at the timing of the clock signal 23, and the data is then output as a reproduced data 24 from the discriminant circuit 21.

In the reproducing operation, the signals which are reproduced from the magnetic tape 40 by the first and second reproducing heads 5 and 15 are very weak. The current levels of the reproduced signals are lower by about 70 dB than the recording currents respectively flowing through the first and second recording heads 4 and 14. In the magnetic recording and reproducing apparatus of Embodiment 1, the recording and reproducing heads and the rotary-transformers are proximately disposed on the small rotary cylinder 31 of a diameter of about 20 mm. Consequently, crosstalk in which a recording signal leaks into a reproduced signal occurs in the magnetic recording and reproducing apparatus of Embodiment 1.

The crosstalk from a recording signal to a reproduced signal occurs through many paths. For example, such paths include those from the first or second recording head 4 or 14 to the first or second reproducing head 5 or 15, from the first or second recording rotary-transformer 3 or 13 to the first or second reproducing rotary-transformer 6 or 16, and from wirings between the recording rotary-transformers and the recording heads to wirings between the reproducing rotary-transformers and the reproducing heads. However, the crosstalk components which finally leak into the output signal of the equalizer 9 through these many paths can be deemed as a signal which is obtained by providing the recording signal 1 with frequency characteristics based on a specific transfer function Therefore, the crosstalk components can be artificially generated by applying the transfer function to the recording signal 1.

In order to produce the artificial crosstalk components, the magnetic recording and reproducing apparatus of Embodiment 1 is provided with a filter 32 serving as the filtering means. For example, the filter 32 is a transversal type filter, receives the recording signal 1 as an input signal, and has frequency characteristics which are similar to a transfer function of the crosstalk components in the system ranging from the recording signal 1 to the output of the equalizer 9. According to this configuration, the output of the filter 32 is a pseudo crosstalk signal 26 which is a signal of the crosstalk components artificially generated. Therefore, the crosstalk components leaking into the reproduced signal are canceled by subtracting the pseudo crosstalk signal 26 from the output of the equalizer 9 in the subtractor 8 serving as the operating means. As a result, crosstalk interference is largely reduced. Consequently, the magnetic recording and reproducing apparatus of Embodiment 1 can be configured as a small apparatus in which reproduced data can be correctly discriminated without being affected by crosstalk components and which has a simultaneous reproducing function.

As mentioned above, according to Embodiment 1 of the present invention, although the small rotary cylinder unit in which separation between the recording and reproduced signals is hardly conducted by electromagnetic means is used, crosstalk interference applied to the reproduced signal can be eventually largely reduced by subtracting the pseudo crosstalk components which are artificially generated, from the reproduced signal. Accordingly, the recording and reproducing apparatus of Embodiment 1 can conduct the reproducing operation substantially simultaneously with the recording operation, thereby enabling the reproduction to be conducted highly accurately.

Embodiment 2

Next, a magnetic recording and reproducing apparatus of Embodiment 2 of the present invention will be mentioned with reference to accompanying drawings of FIGS. 4 to 7.

In the same manner as the above-mentioned magnetic recording and reproducing apparatus of Embodiment 1, the magnetic recording and reproducing apparatus of Embodiment 2 comprises a pair of recording heads and a pair of reproducing heads which are mounted on a small rotary cylinder as shown in FIGS. 1 and 2, and digital data are recorded onto and reproduced from a magnetic tape which is slantly wound on the rotary cylinder and travels thereon. The magnetic recording and reproducing apparatus of Embodiment 2 is different from the above-mentioned Embodiment 1 in the method of suppressing crosstalk in the signal system. This method will be mentioned.

Figure 4:
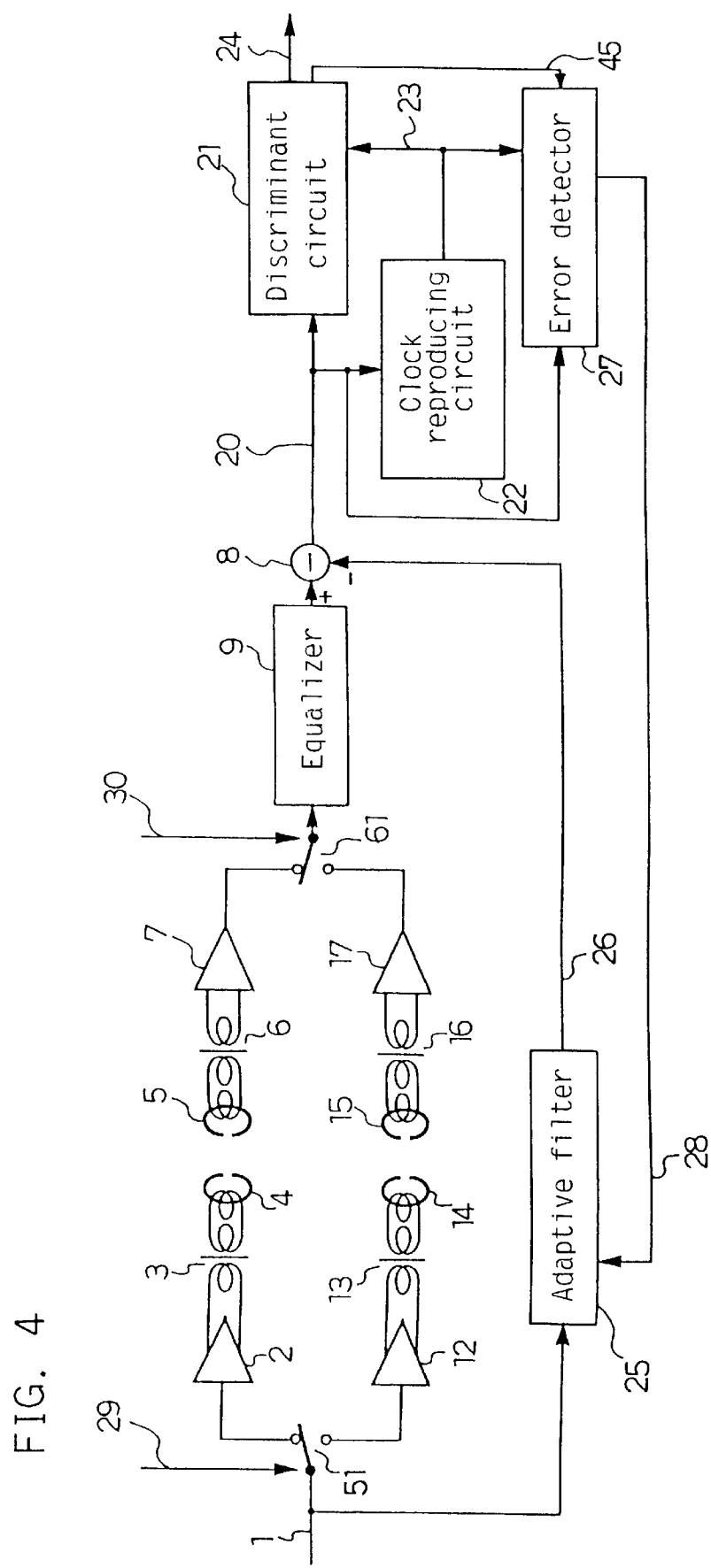
FIG. 4 is a block diagram showing the signal system in a magnetic recording and reproducing apparatus of Embodiment 2 of the present invention.

FIG. 4 is a signal system diagram of the magnetic recording and reproducing apparatus of Embodiment 2. In FIG. 4, portions having the same function as those of Embodiment 1 are designated by the same reference numerals, and their description is omitted.

As shown in FIG. 4, the embodiment is different from Embodiment 1 shown in FIG. 3 in that an adaptive filter 25 is used as the adaptive filtering means in order to obtain the pseudo crosstalk signal 26, and that the embodiment comprises error detecting means consisting of an error detector 27 and the like in order to obtain an error signal 28 which is supplied to the adaptive filter 25. Hereinafter, the configuration and operation of these portions will be mentioned.

In Embodiment 2, the error detecting means is configured with the discriminant circuit 21, the clock reproducing circuit 22, and the error detector 27. The equalized signal 20 which is an output of the subtractor 8 is supplied to the discriminant circuit 21 serving as discriminating means, the clock reproducing circuit 22, and the error detector 27. The clock reproducing circuit 22 outputs the clock signal 23 synchronized with the data. The clock signal 23 is supplied to the discriminant circuit 21 and the error detector 27. The discriminant circuit 21 discriminates the codes of the data at the timing of the clock signal 23, and outputs the reproduced data 24. Furthermore, the discriminant circuit supplies a reference signal 45 which will be mentioned later, to the error detector 27.

Figure 5:
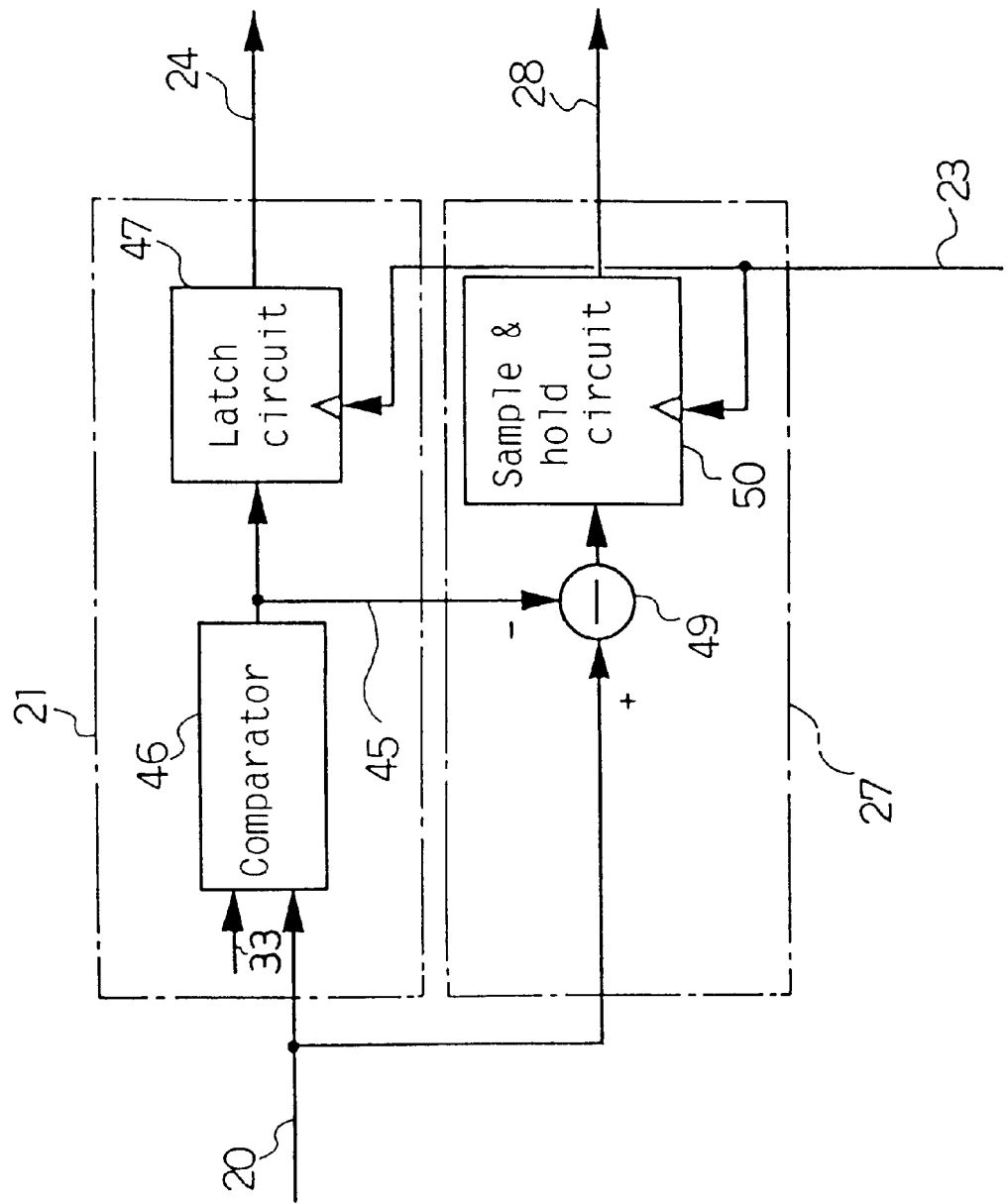
FIG. 5 is a block diagram showing the configuration of error detecting means of the magnetic recording and reproducing apparatus of Embodiment 2 of the present invention.

FIG. 5 is a block diagram specifically showing an example of the discriminant circuit 21 and the error detector 27. As shown in FIG. 5, the discriminant circuit 21 is configured with a comparator 46 and a latch circuit 47. The comparator 46 receives the equalized signal 20 and a threshold level 33, and outputs a result of comparison of the signals as the reference signal 45. An example of relationships among the eye pattern of the equalized signal 20, the threshold level 33, and the reference signal 45 will be mentioned with reference to FIG. 6.

Figure 6:
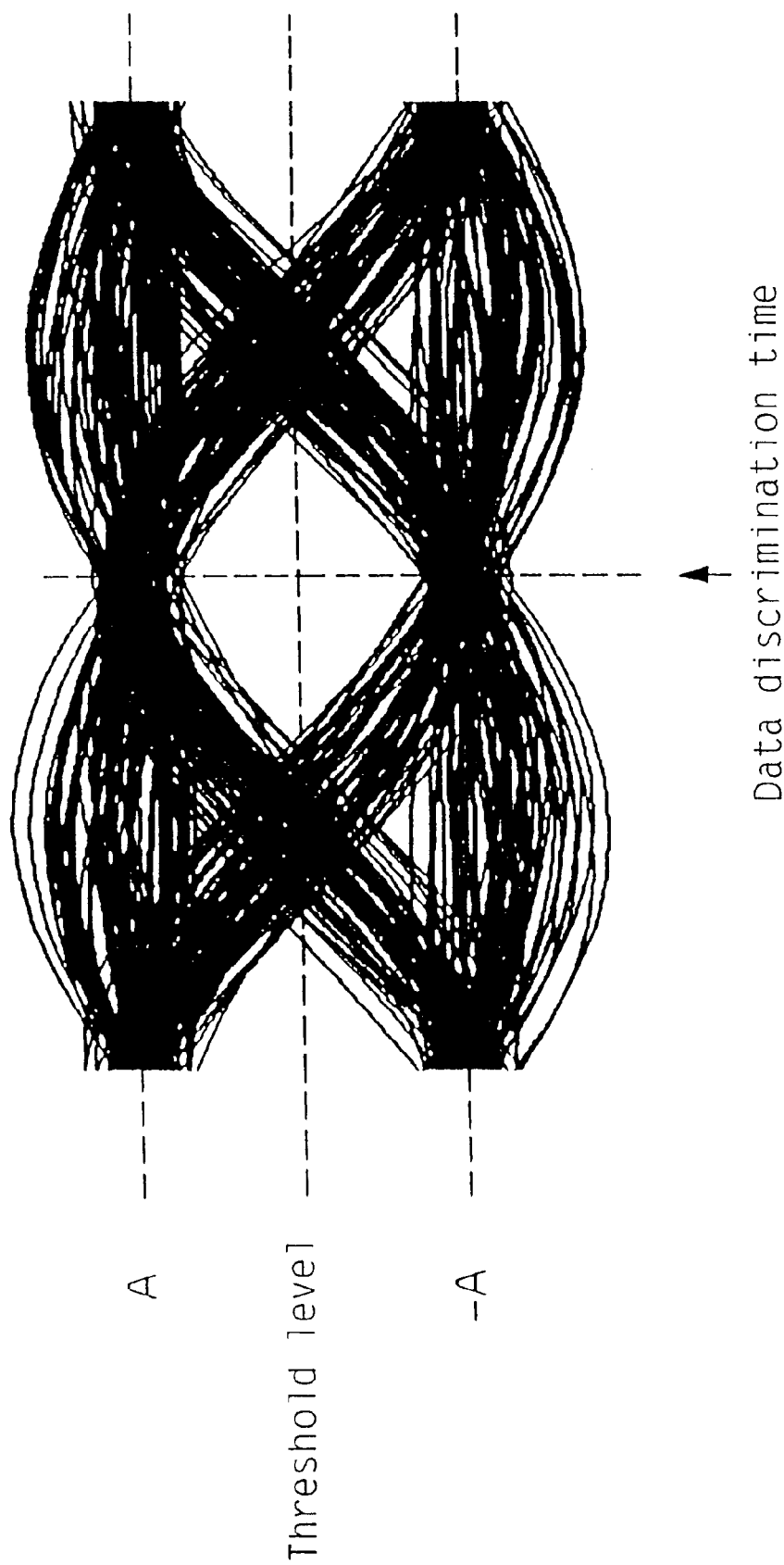
FIG. 6 is an eye pattern diagram illustrating the operation of the error detecting means of the magnetic recording and reproducing apparatus of Embodiment 2 of the present invention.

FIG. 6 shows the eye pattern of the equalized signal 20. At the data discrimination time, the equalized signal 20 has ideally an amplitude of A or −A. As shown in FIG. 6, however, the equalized signal 20 is actually caused not to pass the same point but to have deflection of a certain degree, by noises entering from the magnetic tape, the head system, and the like, or crosstalk from the recording signal. The threshold level 33 supplied to the comparator 46 is set to be an intermediate value between the amplitudes A and −A as shown in FIG. 6. The comparator 46 compares the threshold level 33 with the equalized signal 20. If the equalized signal 20 is larger than the threshold level 33, the comparator outputs the amplitude A as the reference signal 45, and, if the equalized signal 20 is smaller than the threshold level 33, outputs the amplitude −A.

As shown in FIG. 5, the reference signal 45 output from the comparator 46 is supplied to the latch circuit 47. The latch circuit 47 latches the data discrimination time synchronized with the data at the timing of the clock signal 23, and outputs the reproduced data 24.

The error detector 27 is configured with a subtractor 49 serving as the operating means, and a sample and hold circuit 50. The subtractor 49 outputs the amplitude of the difference which is obtained by subtracting the reference signal 45 from the equalized signal 20. The value of the amplitude is held in the sample and hold circuit 50 at the timing of the clock signal 23. As a result, the output of the sample and hold circuit 50 indicates the error between the amplitude of the equalized signal 20 at the data discrimination time and the value which the signal should originally have. The output is used as the error signal 28.

Referring to FIG. 4, the error signal 28 output from the error detector 27 is supplied to the adaptive filter 25. The adaptive filter 25 receives also the recording signal 1 which is a signal to be recorded.

Figure 7:
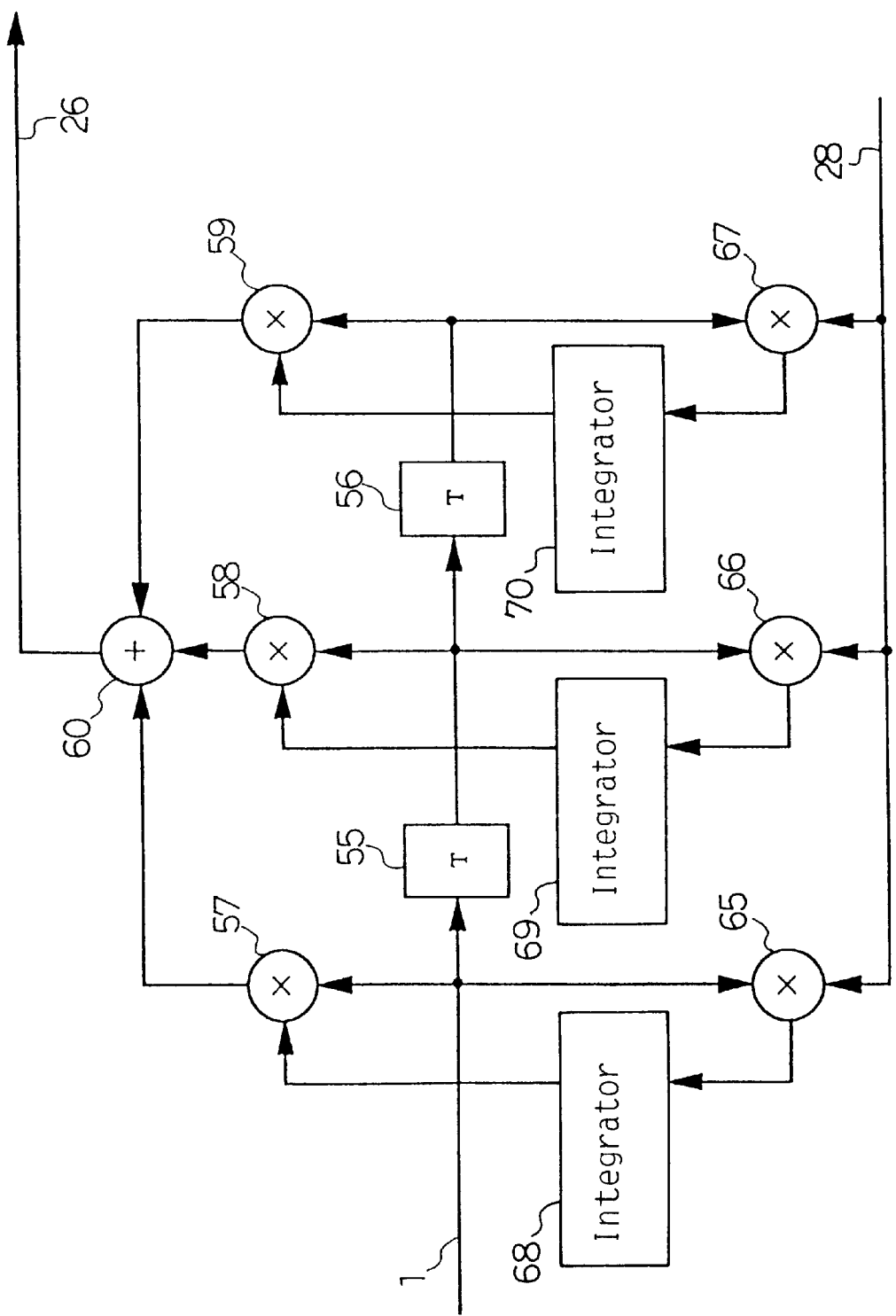
FIG. 7 is a block diagram showing the configuration of an adaptive filter of the magnetic recording and reproducing apparatus of Embodiment 2 of the present invention.

FIG. 7 is a block diagram specifically showing an example of the adaptive filter 25. In the example, the adaptive filter 25 comprises of a 3-tap transversal type filter and operates so that the root mean square of the error signal 28 is always minimum.

The adaptive filter 25 shown in FIG. 7 has first and second delay circuits 55 and 56 which serve as delaying means. The first and second delay circuits 55 and 56 delay the recording signal 1 by a one-bit period T. Therefore, the recording signal 1 is sequentially delayed by the first and second delay circuits 55 and 56.

The adaptive filter 25 further has multipliers 65, 66, and 67 which serve as multiplying means. The three multipliers 65, 66, and 67 constitute the first multiplying means. The error signal 28 is supplied to one input of each of the multipliers 65, 66, and 67. As shown in FIG. 7, the recording signal 1, the output signal of the first delay circuit 55, and the output signal of the second delay circuit 56 are supplied to the other inputs of the multipliers 65, 66, and 67, respectively.

The output signals of the multipliers 65, 66, and 67 are supplied to integrators 68, 69, and 70 serving as the integrating means, respectively, so that the output signals of the multipliers 65, 66, and 67 are integrated.

The adaptive filter 25 has three multipliers 57, 58, and 59 to which the output signals of the integrators 68, 69, and 70 are supplied, respectively. The three multipliers 57, 58, and 59 constitute the second multiplying means. The recording signal 1 is supplied to one input of the multiplier 57, the output signal of the first delay circuit 55 to that of the multiplier 58, and the output signal of the second delay circuit 56 to that of the multiplier 59, The output signals of the multipliers 57, 58, and 59 are supplied to an adder 60 which serves as the operating means, and the total sum of the signals is output as the pseudo crosstalk signal 26.

The recording signal and the signals obtained by delaying the recording signal which are respectively supplied to the multipliers 57, 58, and 59, and 65, 66, and 67 are digital signals indicative of "1" or "−1." Therefore, each of these multipliers can be realized by a switch circuit which switches over the manners of the output operation, i e., the such output operation that the one input is output as it is, or that the one input is inverted and then output, depending on the digital codes of the recording signal 1, etc. that are the signals supplied to the other input.

The principle in which the adaptive filter 25 shown in FIG. 7 adaptively operates so that the pseudo crosstalk signal 26 optimally approximates to the crosstalk signal leaking into the reproduced signal will be mentioned with using expressions. In the following description, for the sake of simplicity, a signal at the discrimination time of an i-th order (i is an integer) is dealt (in the following expressions, a suffix i is attached to the signal).

In the output of the equalizer 9, the signal component included in the output is indicated by s, the crosstalk components leaking from the recording signal 1 into the reproduced signal by x, and the noise components from the tape and the like by n. The pseudo crosstalk signal 26 is indicated by y. When the equalized signal 20 at the data discrimination time i is indicated by v, v can be shown by expression (1):

$$v_i = s_i + x_i + n_i - y_i \qquad (1)$$

When the error signal 28 is indicated by e and it is assumed that the reference signal 45 obtained in the discriminant circuit 21 is equal to the signal components s, the error signal ($e_i$) at time i can be shown by the following expression:

$$e_i = x_i - y_i + n_i \qquad (2)$$

If both sides of expression (2) are squared, the following is held:

$$e_i^2 = (x_i - y_i)^2 + 2(x_i - y_i)n_i + n_i^2 \qquad (3)$$

In order to optimally approximate the pseudo crosstalk signal 26 to the crosstalk components leaking into the reproduced signal in the meaning of minimizing the root mean square error, the characteristics of the adaptive filter 25 are changed so that the average of the first term of the right side of expression (3) with respect to time i is minimum. When the averages with respect to time i of both sides of expression (3) are considered, the average of the second term of the right side zero because the average of the noise components n is zero. The third term of the right side is independent from the pseudo crosstalk signal y, and therefore, by selecting that the time average of expression (3) is set to be minimum, this results in that the pseudo crosstalk signal 26 is optimally approximated to the crosstalk signal leaking into the reproduced signal.

When the recording signal 1 which is the input signal of the adaptive filter 25 in FIG. 7 is indicated by r and the outputs of the integrators 68, 69, and 70 are indicated by $C_j$ (j=−1, 1, and 1), the pseudo crosstalk signal ($y_i$) which is the output of the adaptive filter 25 at time i is shown by the following expression:

$$y_i = \sum_j C_j \cdot r_{i-j} \qquad (4)$$

At this time, in order to update the tap coefficient $C_j$ which indicates the outputs of the integrators 68, 69, and 70 so that the time average of expression (3) is minimum, updation is conducted at any time in accordance with the following expression.

$$Cj \rightarrow Cj - \alpha \cdot \frac{\partial e_i^2}{\partial Cj} \qquad (5)$$

where α is a constant for determining the convergence speed.

Substituting expressions (2) and (4) in expression (5), following expression (6) is obtained:

$$Cj \rightarrow Cj + 2\alpha \cdot r_{i-j} \cdot e_i \qquad (6)$$

From expression (6), it will be noted that the tap coefficient $C_j$ can be obtained by time-integrating a product of the error signal ($e_i$) at time i and the recording signal ($r_{i-j}$) at time i−j. The above-mentioned principle is embodied in the adaptive filter 25 shown in FIG. 7.

In the adaptive filter 25 of Embodiment 2, therefore, its characteristics are changed so that the pseudo crosstalk signal 26 always optimally approximates to the crosstalk component leaking into the reproduced signal in the meaning of minimizing the root mean square error.

As mentioned above, in the magnetic recording and reproducing apparatus of Embodiment 2, the pseudo crosstalk signal 26 is subtracted in the subtractor 8 from the output signal of the equalizer 9, whereby the crosstalk components leaking into the reproduced signal are canceled so as to be largely reduced. In the magnetic recording and reproducing apparatus of Embodiment 2, therefore, the reproduced signal consisting of digital data can be correctly discriminated without being affected by the crosstalk components and a simultaneous reproducing function can be realized.

In Embodiment 2 of the present invention, in addition to the same effects as those of the above-mentioned Embodiment 1, a pseudo crosstalk signal can be always adaptively generated. Even when the condition of crosstalk is changed in accordance with the rotation phase of the rotary cylinder or by changes in properties due to changes in temperature or with ages of the heads and electrical parts, simultaneous reproduction can be always conducted under the best conditions.

The above-mentioned magnetic recording and reproducing apparatus of Embodiment 2 is an example in which the adaptive filtering means is configured by a 3-tap transversal type filter. The present invention is not restricted to this configuration. For example, the filter may have taps of a larger number. This allows the pseudo crosstalk signal to more correctly approximate to the crosstalk component, with the result that the effect of reducing crosstalk can be further enhanced.

Alternatively, the adaptive filtering means may be configured so that a fixed filter portion in which characteristics are always fixed, and a variable filter portion in which characteristics are adequately changed in accordance with the condition of crosstalk are cascade-connected. According to this configuration, even in an apparatus of a small circuit scale, the pseudo crosstalk signal can be correctly approximated to crosstalk components and adequately follow the change in crosstalk.

The above-mentioned magnetic recording and reproducing apparatus of Embodiment 2 is an example in which the characteristics are changed by the adaptive filtering means with using the root mean square error so that the pseudo crosstalk signal always optimally approximates to a crosstalk signal leaking into the reproduced signal. The present invention is not restricted to this, and the apparatus may be configured so that, for example, the absolute value or the maximum value of the difference between the pseudo crosstalk signal and crosstalk components leaking into the reproduced signal is reduced.

The above-mentioned magnetic recording and reproducing apparatus of Embodiment 2 is an example in which the error detecting means detects an error from the output signal of the equalizer and the reference signal of the discriminant circuit. The present invention is not restricted to this example. Alternatively, the output signal of the equalizer may be used as the error information, or the error information may be obtained from the reproduced signal which has not yet been subjected equalization.

Embodiment 3

Figure 8A:
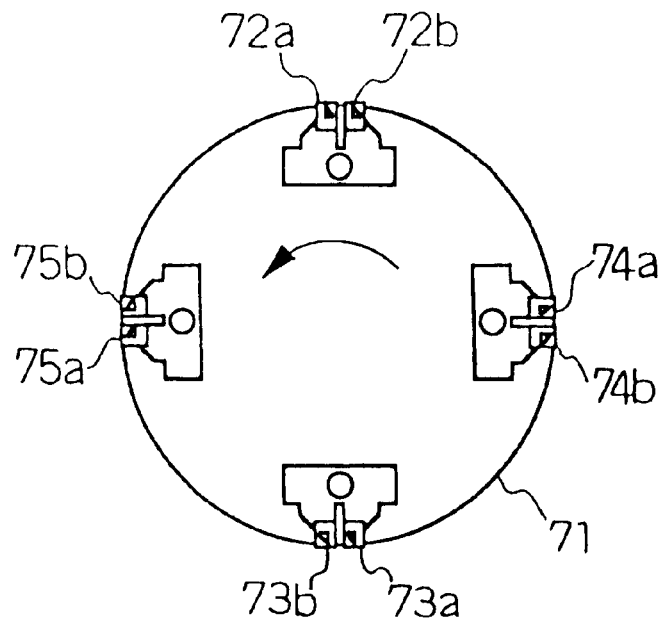
FIG. 8 is a diagram showing the head arrangement of a rotary cylinder of a magnetic recording and reproducing apparatus of Embodiment 3 of the present invention.
Figure 8B:
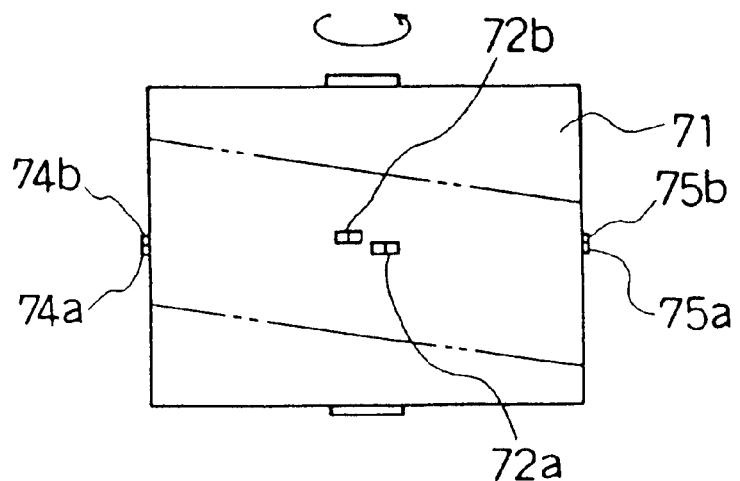
Figure 9:
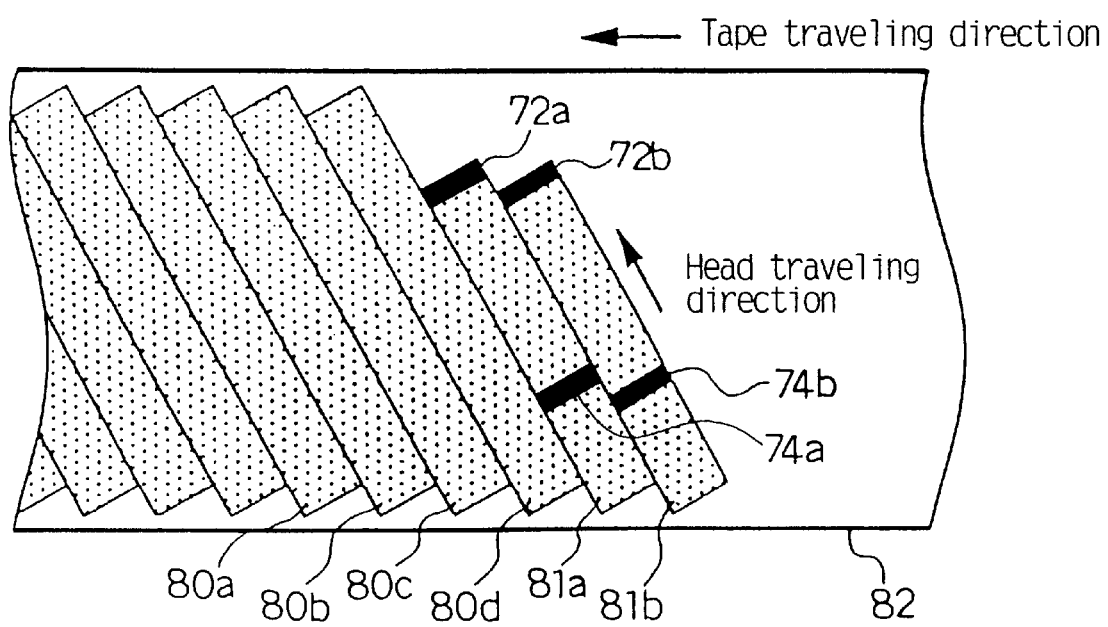
FIG. 9 is a diagram showing relationships between recording tracks on a magnetic tape and the head arrangement in the magnetic recording and reproducing apparatus of Embodiment 3 of the present invention.
Figure 10:
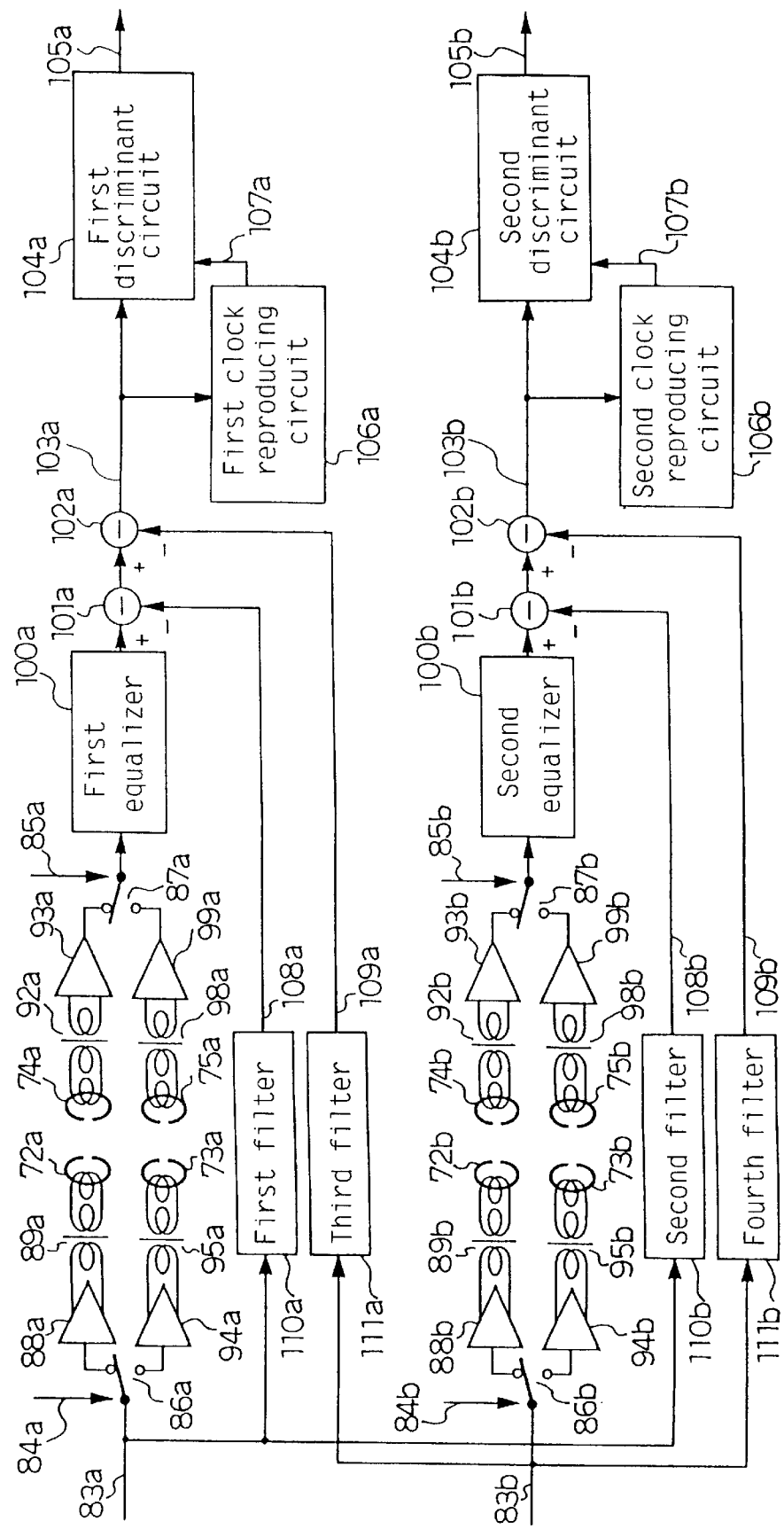
FIG. 10 is a block diagram showing the signal system in the magnetic recording and reproducing apparatus of Embodiment 3 of the present invention.

Next, a magnetic recording and reproducing apparatus which is Embodiment 3 of the present invention will be mentioned with reference to accompanying drawings of FIGS. 8 to 10.

Embodiment 3 of the recording and reproducing apparatus of the present invention is similar in configuration to Embodiment 1 mentioned above, except that Embodiment 3 has a two-channel system in which two recording heads simultaneously conduct the recording operation and two reproducing heads simultaneously conduct the reproducing operation in order to realize the recording and reproducing operations at a higher data rate.

FIG. 8 is a diagram showing the head arrangement of a rotary cylinder 71 of the magnetic recording and reproducing apparatus of Embodiment 3. In FIG. 8, (A) is a plan view of the rotary cylinder 71 and (B) is a schematic side view of the rotary cylinder 71. The rotary cylinder 71 is small in size or has a diameter of about 20 mm, and rotates in a counterclockwise direction as indicated by the arrow in (A) of FIG. 8. The rotary cylinder 71 has four recording heads. That is, a first recording head 72a, a second recording head 72b, a third recording head 73a, and a fourth recording head 73b are arranged on the rotary cylinder 71. The rotary cylinder 71 has four reproducing heads. That is, a first reproducing head 74a, a second reproducing head 74b, a third reproducing head 75a, and a fourth reproducing head 75b are arranged on the rotary cylinder 71. As shown in the side view of (B) of FIG. 8, heads which are adjacent to each other, for example, the first and second recording heads 72a and 72b are positioned so that their gaps are shifted from each other in the height direction by a distance corresponding to one track pitch. The magnetic tape travels with being slantly wrapped in a zone corresponding to a semicircle (180 degrees) of the rotary cylinder 71.

FIG. 9 is a diagram showing positional relationships between recording tracks on the magnetic tape 82 and the heads. As shown in FIG. 9, tracks are slantly formed on the magnetic tape 82 by the recording heads. Tracks 80a, 80b, 80c, and 80d shown in FIG. 9 have been already recorded by the first recording head 72a, the second recording head 72b, the third recording head 73a, and the fourth recording head 73b, respectively. Tracks 81a, and 81b, are currently recorded by the first and second recording heads 72a and 72b, respectively. At this time, the first and second reproducing heads 74a, and 74b, trace the tracks 81a, and 81b, with a slight delay with respect to the first and second recording heads 72a and 72b, respectively, so as to conduct the reproducing operation. Therefore, the magnetic recording and reproducing apparatus of Embodiment 3 can conduct the recording and reproducing operations at the substantially same time, so that the recorded contents can be checked.

Although not illustrated, in the same manner as the case of the first and second recording heads 72a and 72b and the first and second reproducing heads 74a, and 74b, the tracks which are recorded by the third and fourth recording heads 73a and 73b are subjected to the reproducing operation by the third and fourth reproducing heads 75a and 75b substantially simultaneously with the recording operation.

FIG. 10 is a diagram of the signal system in the magnetic recording and reproducing apparatus of Embodiment 3. Referring to FIG. 10, the recording signal containing digital data to be recorded is previously split into two systems so as to be supplied as first and second recording signals 83a and 83b.

The first recording signal 83a is supplied to a first recording changeover switch 86a which is controlled by a first recording head switch signal 84a synchronized with the rotary cylinder 71. During a period when the first recording head 72a makes contact with the magnetic tape 82, the first recording changeover switch 86a is connected to the upper terminal in FIG. 10. In this case, the signal which is to be recorded and is supplied through the first recording changeover switch 86a is amplified by a first recording amplifier 88a. The signal which is to be recorded and has been amplified is guided to the first recording head 72a on the rotary cylinder 71 through a first recording rotary-transformer 89a and then recorded onto the magnetic tape 82.

During a period when the third recording head 73a makes contact with the magnetic tape 82, the first recording changeover switch 86a is connected to the lower terminal in FIG. 10. In this case, the signal which is to be recorded and is supplied through the first recording changeover switch 86a is guided to the third recording head 73a on the rotary cylinder 71 through a third recording amplifier 94a and a third recording rotary-transformer 95a and then recorded onto the magnetic tape 82.

In the same manner as the first recording signal 83a mentioned above, the second recording signal 83b is supplied to a second recording changeover switch 86b which is controlled by a second recording head switch signal 84b synchronized with the rotary cylinder 71. During a period when the second recording head 72b makes contact with the magnetic tape 82, the second recording changeover switch 86b is connected to the upper terminal in FIG. 10. In this case, the signal which is to be recorded and is supplied through the second recording changeover switch 86b is amplified by a second recording amplifier 88b. The signal which is to be recorded and has been amplified is guided to the second recording head 72b on the rotary cylinder 71 through a second recording rotary-transformer 89b and then recorded onto the magnetic tape 82.

During a period when the fourth recording head 73b makes contact with the magnetic tape 82, the second recording changeover switch 86b is connected to the lower terminal in FIG. 10. In this case, the signal which is to be recorded and is supplied through the second recording changeover switch 86b is guided to the fourth recording head 73b on the rotary cylinder 71 through a fourth recording amplifier 94b and a fourth recording rotary-transformer 95b and then recorded onto the magnetic tape 82.

Next the operation of the reproduction unit of the magnetic recording and reproducing apparatus of Embodiment 3 will be mentioned.

A first reproducing changeover switch 87a is controlled by a first reproducing head switch signal 85a which is synchronized with the rotary cylinder 71. Therefore, during a period when the first reproducing head 74a makes contact with the magnetic tape 82, therefore, the first reproducing changeover switch 87a is connected to the upper terminal in FIG. 10, and, during a period when the third reproducing head 75a makes contact with the magnetic tape 82, it is connected to the lower terminal. Therefore, during a period when the first reproducing head 74a makes contact with the magnetic tape 82, therefore, a signal which has been reproduced by the first reproducing head 74a on the rotary cylinder 71 passes through a first reproducing rotary-transformer 92a and is then amplified by a first reproducing amplifier 93a. The amplified signal is supplied to a first equalizer 100a through the first reproducing changeover switch 87a.

During a period when the third reproducing head 75a makes contact with the magnetic tape 82, a signal which has been reproduced by the third reproducing head 75a passes through a third reproducing rotary-transformer 98a and is then amplified by a third reproducing amplifier 99a. The amplified signal is supplied to the first equalizer 100a through the first reproducing changeover switch 87a. In the first equalizer 100a, the frequency characteristics of the system ranging from the recording operation to the reproducing operation are corrected, and the signal is equalized in order to enable digital codes of the data to be discriminated.

The signal which has been equalized in the first equalizer 100a passes through first and second subtractors 101a and 102a serving as the operating means, to be formed as an equalized signal 103a. The equalized signal 103a is supplied to a first clock reproducing circuit 106a. The first clock reproducing circuit 106a outputs a clock signal 107a synchronized with the data. The equalized signal 103a is supplied also to a first discriminant circuit 107a. The first discriminant circuit 107a discriminates the digital codes of the data at the timing of the clock signal 107a, and outputs a first reproduced data 105a.

In the same manner as the first reproducing changeover switch 87a, a second reproducing changeover switch 87b is controlled by a second reproducing head switch signal 85b which is synchronized with the rotary cylinder 71. During a period when the second reproducing head 74b, makes contact with the magnetic tape 82, the second reproducing changeover switch 87b is connected to the upper terminal, and, during a period when the fourth reproducing head 75b makes contact with the magnetic tape 82, it is connected to the lower terminal. Therefore, during a period when the second reproducing head 74b, makes contact with the magnetic tape 82, a signal which has been reproduced by the second reproducing head 74b, on the rotary cylinder 71 passes through a second reproducing rotary-transformer 92b and is then amplified by a second reproducing amplifier 93b. The amplified signal is supplied to a second equalizer 100b through the second reproducing changeover switch 87b.

During a period when the fourth reproducing head 75b makes contact with the magnetic tape 82, a signal which has been reproduced by the fourth reproducing head 75b passes through a fourth reproducing rotary-transformer 98b and is then amplified by a fourth reproducing amplifier 99b. The amplified signal is supplied to the second equalizer 100b through the second reproducing changeover switch 87b. In the second equalizer 100b, the frequency characteristics of the system ranging from the recording operation to the reproducing operation are corrected, and the signal is equalized in order to enable digital codes of the data to be discriminated The signal which has been equalized in the second equalizer 100b passes through third and fourth subtractors 101b and 102b serving as the operating means, to be formed as an equalized signal 103b. The equalized signal 103b is supplied to a second clock reproducing circuit 106b. The second clock reproducing circuit 106b outputs a clock signal 107b synchronized with the data The equalized signal 103b is supplied also to a second discriminant circuit 104b. The second discriminant circuit 104b discriminates the digital codes of the data at the timing of the clock signal 107b, and outputs a second reproduced data 105b.

The signal which is reproduced from the magnetic tape 82 by the first reproducing head 74a, the second reproducing head 74b, the third reproducing head 75a, or the fourth reproducing head 75b is very weak. The current level of the reproduced signal is lower by about 70 dB than the recording current flowing through the first recording head 72a, the second recording head 72b, the third recording head 73a, or the fourth recording head 73b. The recording and reproducing heads and the rotary-transformers are proximately disposed on the small rotary cylinder 71 of a diameter of about 20 mm. Consequently, there occurs crosstalk in which a recording signal leaks into a reproduced signal.

In the magnetic recording and reproducing apparatus of Embodiment 3, for example, the first and second recording heads 72a and 72b simultaneously operate as shown in FIG. 9. Therefore, the reproduced signals of the first and second reproducing heads 74a, and 74b, simultaneously undergo crosstalk interference due to the two recording signals, i.e., the first and second recording signals 83a and 83b. In the magnetic recording and reproducing apparatus of Embodiment 3, also when the third and fourth reproducing heads 75a and 75b operate, the reproduced signals simultaneously undergo crosstalk interference due to the two recording signals The first recording signal 83a is supplied to a first filter 110a serving as the filtering means The first filter 110a has characteristics which are similar to a transfer function of crosstalk components in the system ranging from the first recording signal 83a to the output of the first equalizer 100a. According to this configuration, the output of the first filter 110a is a first pseudo crosstalk signal 108a which is obtained by artificially generating crosstalk components from the first recording signal 83a.

The second recording signal 83b is supplied to a third filter 111a serving as the filtering means The third filter 111a has characteristics which are similar to a transfer function of crosstalk components in the system ranging from the second recording signal 83b to the output of the first equalizer 100a. According to this configuration, the output of the third filter 111a is a third pseudo crosstalk signal 109a which is obtained by artificially generating crosstalk components from the second recording signal 83b.

Therefore, in the first and second subtractors 101a and 102a serving as the operating means, crosstalk components of both two systems leaking into the reproduced signal are canceled by subtracting the first and third pseudo crosstalk signals 108a and 109a from the output signal of the first equalizer 100a. As a result, crosstalk interference is largely reduced Consequently, the first reproduced data 105a output from the first discriminant circuit 104a consists of data in which digital codes are correctly discriminated without being affected by crosstalk components In the same manner as the first and third filters 110a and 111a mentioned above, the second and fourth filters 110b and 111b output second and fourth pseudo crosstalk signals 108b and 109b, respectively. Also the third and fourth subtractors 101b and 102b serving as the operating means function in the same manner as the first and second subtractors 101a and 102a, so that crosstalk components leaking into the output of the second equalizer 100b are subtracted and the crosstalk components of both the two systems leaking into the reproduced signal are canceled, whereby crosstalk interference is largely reduced As a result, the second reproduced data 105b output from the second discriminant circuit 104b consists of data in which digital codes are correctly discriminated without being affected by crosstalk components Consequently, the magnetic recording and reproducing apparatus of Embodiment 3 results in an apparatus having a highly accurate simultaneous reproducing function As mentioned above, since the magnetic recording and reproducing apparatus of Embodiment 3 of the present invention has a two-channel system in which the recording and reproducing operations are conducted at a higher data rate, crosstalk phenomena due to the two systems are concurrently generated. In the magnetic recording and reproducing apparatus of Embodiment 3, however, crosstalk of the two systems is canceled, and crosstalk interference applied to the reproduced signal is eventually largely reduced. Consequently, the magnetic recording and reproducing apparatus of Embodiment 3 can be configured as an apparatus which is small in size but can conduct simultaneous reproduction.

In Embodiment 3, the two-channel configuration in which the two recording heads simultaneously conduct the recording operation and the two reproducing heads simultaneously conduct the reproducing operation has been mentioned. The recording and reproducing apparatus of the present invention is not restricted to this configuration. In order to conduct the recording and reproducing operations at a further higher data rate, the number of channels may be increased. Also in this case, the apparatus can be configured in a similar manner.

Embodiment 4

Figure 11:
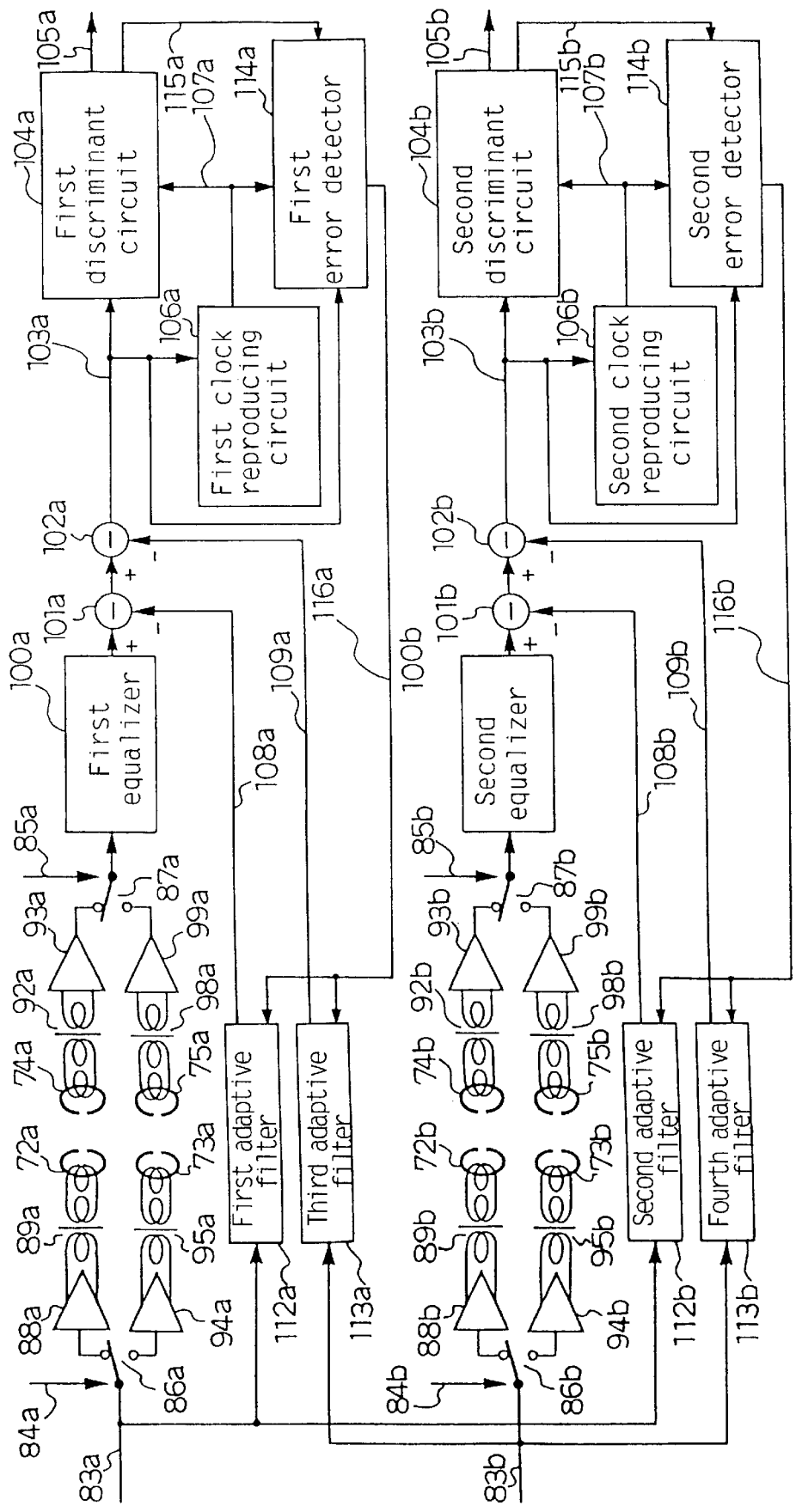
FIG. 11 is a block diagram showing the signal system in a magnetic recording and reproducing apparatus of Embodiment 4 of the present invention.

Next, a magnetic recording and reproducing apparatus which is Embodiment 4 of the present invention will be mentioned with reference to accompanying drawing of FIG. 11.

In the same manner as the above-mentioned magnetic recording and reproducing apparatus of Embodiment 3, the magnetic recording and reproducing apparatus of Embodiment 4 has the two-channel configuration in which the two recording heads simultaneously conduct the recording operation and the two reproducing heads simultaneously conduct the reproducing operation, but is different from the magnetic recording and reproducing apparatus of Embodiment 3 in that adaptive filters similar to those used in the magnetic recording and reproducing apparatus of Embodiment 2 are used in the signal systems in order to generate pseudo crosstalk signals.

FIG. 11 is a diagram of the signal system in the magnetic recording and reproducing apparatus of Embodiment 4. Portions having the same function as those of the magnetic recording and reproducing apparatus of Embodiment 3 are designated by the same reference numerals, and their description is omitted.

Referring to FIG. 11, the embodiment is different from Embodiment 3 mentioned above and shown in FIG. 10 in that a first adaptive filter 112a, a second adaptive filter 112b, a third adaptive filter 113a, and a fourth adaptive filter 113b are used as the adaptive filtering means in order to obtain the first pseudo crosstalk signal 108a, the second pseudo crosstalk signal 108b, the third pseudo crosstalk signal 109a, and the fourth pseudo crosstalk signal 109b. Furthermore, Embodiment 4 is different from Embodiment 3 in that, in order to obtain first and second error signals 116a and 116b which are supplied to the adaptive filters, two error detecting means respectively comprising first and second error detectors 114a and 114b are disposed.

Next, the configuration and operation of the magnetic recording and reproducing apparatus of Embodiment 4 will be mentioned.

Referring to FIG. 11, first error detecting means comprises the first discriminant circuit 104a, the first clock reproducing circuit 106a, and the first error detector 114a. The equalized signal 103a which is the output of the second subtractor 102a is supplied to the first discriminant circuit 104a serving as discriminating means, the first clock reproducing circuit 106a, and the first error detector 114a. The first clock reproducing circuit 106a outputs the clock signal 107a synchronized with the data. The clock signal 107a is supplied to the first discriminant circuit 104a and the first error detector 114a. The first discriminant circuit 104a discriminates the digital codes of the data at the timing of the clock signal 107a, outputs a first reproduced data 105a, and supplies a reference signal 115a which will be mentioned later, to the first error detector 114a.

The first discriminant circuit 104a and the first error detector 114a are configured in the same manner as those used in Embodiment 2 and shown in FIG. 5, and hence their description is omitted However, Embodiment 4 is configured so that the error between the amplitude of the equalized signal 103a at the data discrimination time and the value which the signal should originally have is output as the first error signal 116a from the first error detector 114a.

The first error signal 116a output from the first error detector 114a is supplied to the first and third adaptive filters 112a and 113a which serve as the adaptive filtering means The first recording signal 83a is supplied to the first adaptive filter 112a and the second recording signal 83b is supplied to the third adaptive filter 113a.

The first adaptive filter 112a outputs the first pseudo crosstalk signal 108a which optimally approximates to frequency characteristics of crosstalk components of the system ranging from the first recording signal 83a to the first equalizer 100a. The third adaptive filter 113a outputs the third pseudo crosstalk signal 109a which optimally approximates to frequency characteristics of crosstalk components of the system ranging from the second recording signal 83b to the first equalizer 100a.

The configuration and operation of the first or third adaptive filter 112a or 113a are the same as those of the adaptive filter 25 used in Embodiment 2 and shown in FIG. 7, and hence their description is omitted.

In the first and second subtractors 101a and 102a serving as the operating means, crosstalk components of both the two systems leaking into the reproduced signal are canceled by subtracting the first and third pseudo crosstalk signals 108a and 109a from the output signal of the first equalizer 100a. As a result, crosstalk interference is largely reduced. Consequently, the first reproduced data 105a consists of data in which digital codes are correctly discriminated without being affected by crosstalk components.

In the same manner as the first error detecting means mentioned above, second error detecting means comprises the second discriminant circuit 104b, the second clock reproducing circuit 106b, and the second error detector 114b.

In the magnetic recording and reproducing apparatus of Embodiment 4, the equalized signal 103b which is the output of the fourth subtractor 102b is supplied to the second discriminant circuit 104b serving as discriminating means, the second clock reproducing circuit 106b, and the second error detector 114b. The second clock reproducing circuit 106b outputs the clock signal 107b synchronized with the data. The clock signal 107b is supplied to the second discriminant circuit 104b and the second error detector 114b. The second discriminant circuit 104b discriminates the codes of the data at the timing of the clock signal 107b, outputs a second reproduced data 105b, and supplies a reference signal 115b to the second error detector 114b.

The second error detector 114b outputs the error between the amplitude of the equalized signal 103b at the data discrimination time and the value which the signal should originally have, as the error signal 116b. The error signal 116b output from the second error detector 114b is supplied to the second and fourth adaptive filters 112b and 113b which serve as the adaptive filtering means The first recording signal 83a is supplied to the second adaptive filter 112b and the second recording signal 83b is supplied to the fourth adaptive filter 113b.

The second adaptive filter 112b outputs the second pseudo crosstalk signal 108b which optimally approximates to frequency characteristics of crosstalk components of the system ranging from the first recording signal 83a to the second equalizer 100b. The fourth adaptive filter 113b outputs the fourth pseudo crosstalk signal 109b which optimally approximate to frequency characteristics of crosstalk components of the system ranging from the second recording signal 83b to the second equalizer 100b.

In the third and fourth subtractors 101b and 102b serving as the operating means, crosstalk components of both the two systems leaking into the reproduced signal are canceled by subtracting the second and fourth pseudo crosstalk signals 108b and 109b from the output signal of the second equalizer 100b. As a result, crosstalk interference is largely reduced. Consequently, the second reproduced data 105b consists of data which are correctly discriminated without being affected by crosstalk components. Accordingly, the magnetic recording and reproducing apparatus of Embodiment 4 can be configured as a small apparatus which can conduct simultaneous reproduction.

As mentioned above, since the magnetic recording and reproducing apparatus of Embodiment 4 of the present invention has a two-channel system in which the recording and reproducing operations are conducted at a higher data rate, crosstalk phenomena due to the two systems are concurrently generated. In the magnetic recording and reproducing apparatus of Embodiment 4, however, crosstalk of the two systems is canceled in the same manner as Embodiment 3, and crosstalk interference applied to the reproduced signal is eventually largely reduced.

In the magnetic recording and reproducing apparatus of Embodiment 4, optimum pseudo crosstalk signals are always generated. Even when the condition of crosstalk is changed in accordance with the rotation phase of the rotary cylinder or by changes in properties due to changes in temperature or with ages of the heads and electrical parts, therefore, simultaneous reproduction can be always conducted under the best conditions.

In the magnetic recording and reproducing apparatus of Embodiment 4, the two-channel configuration in which a signal is split into two systems, the two recording heads simultaneously conduct the recording operation, and the two reproducing heads simultaneously conduct the reproducing operation has been mentioned. The present invention is not restricted to this. In order to conduct the recording and reproducing operations at a further higher data rate, the number of channels may be increased or the signal may be split into N systems (N is an integer which is not smaller than 2). Also in this case, the apparatus can be configured in a similar manner.

The above-mentioned magnetic recording and reproducing apparatus of Embodiment 4 is an example in which each of the error detecting means detects an error from the output signal of the corresponding equalizer and the reference level of the corresponding discriminant circuit. The present invention is not restricted to this. Alternatively, the output of each equalizer may be used as the error information, or the error information may be obtained from the signal which has not yet been subjected equalization.

The above-mentioned magnetic recording and reproducing apparatus of Embodiment 4 is an example in which a signal for one system is subjected to alternate recording or reproducing operations conducted by one set of two heads which are positioned on the circumference of the rotary cylinder so as to be separated from each other by 180 degrees. Alternatively, the apparatus may be configured so that a signal for one system is recorded or reproduced by one head. Furthermore, the present invention can be executed also in a configuration in which a signal for one system is subjected to alternate recording or reproducing operations conducted by three or more heads.

Embodiment 5

Hereinafter, a magnetic recording and reproducing apparatus which is Embodiment 5 of the present invention will be mentioned with reference to accompanying drawings of FIGS. 12 to 20.

In the same manner as Embodiments 1 and 2, the magnetic recording and reproducing apparatus of Embodiment 5 comprises a pair of recording heads and a pair of reproducing heads which are mounted on a small rotary cylinder, and digital data are recorded onto and reproduced from a magnetic tape which is slantly wound on the rotary cylinder and travels thereon. In the same manner as Embodiment 2, the magnetic recording and reproducing apparatus of Embodiment 5 reduces crosstalk by means of the adaptive processing, but is partly different from Embodiment 2 in configuration. The different portions will be mentioned.

Figure 12:
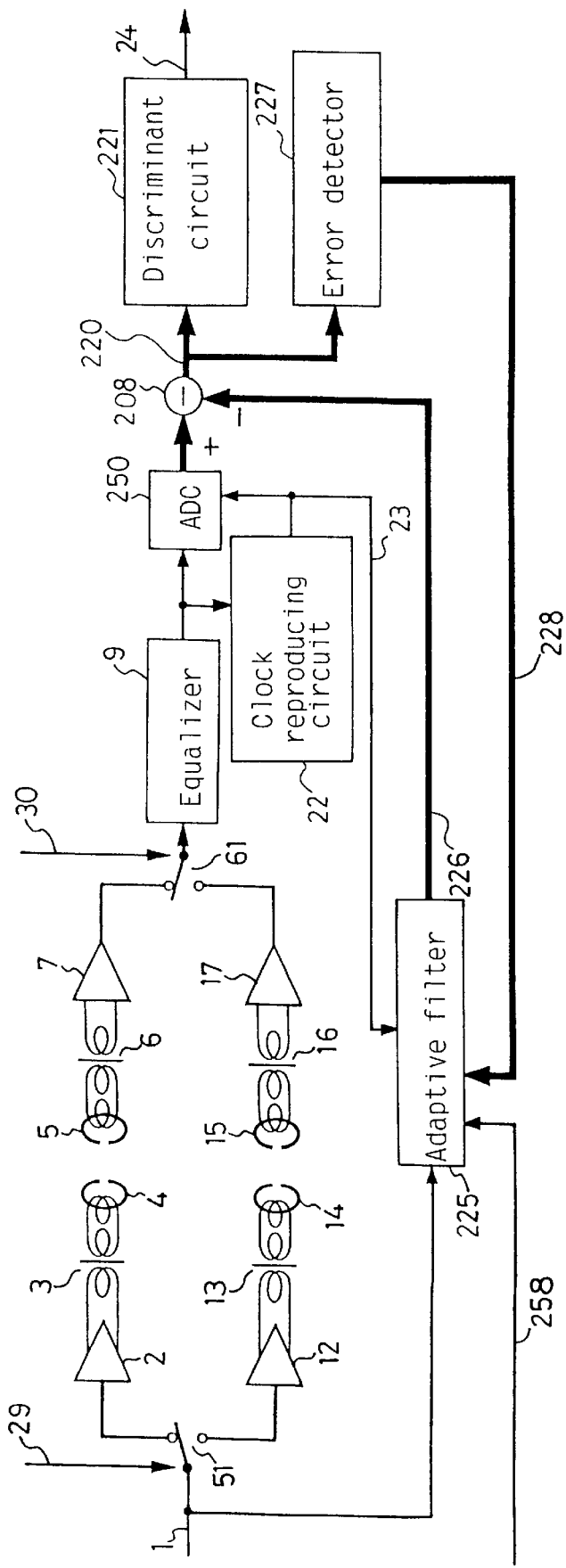
FIG. 12 is a block diagram showing the signal system in a magnetic recording and reproducing apparatus of Embodiment 5 of the present invention.

FIG. 12 is a diagram of the signal system in the magnetic recording and reproducing apparatus of Embodiment 5. Portions having the same function as those of the magnetic recording and reproducing apparatuses of the above-mentioned embodiments are designated by the same reference numerals, and their description is omitted. In FIG. 12, signal lines of a thick line indicate digital signals which are expressed by plural bits, and those of a thin line indicate analog signals or digital signals which are expressed by one bit.

Referring to FIG. 12, as shown in FIG. 1 mentioned above, the first and second recording heads 4 and 14 are mounted on the rotary cylinder 31 and alternatingly make contact with the magnetic tape 40 so as to conduct the recording operation thereon.

A recording data 1 containing digital data to be recorded is supplied to a recording changeover switch 51 which is controlled by the recording head switch signal 29 synchronized with the rotary cylinder 31. During a period when the first recording head 4 makes contact with the magnetic tape 40, the recording changeover switch 51 is connected to the upper terminal in FIG. 12. In this case, the signal which is to be recorded and is supplied through the recording changeover switch 51 is amplified by the first recording amplifier 2. The signal which is to be recorded and has been amplified is guided to the first recording head 4 on the rotary cylinder 31 through the first recording rotary-transformer 3 and then recorded onto the magnetic tape 40.

During a period when the second recording head 14 makes contact with the magnetic tape 40, the recording changeover switch 51 is connected to the lower terminal in FIG. 12. In this case, the signal which is to be recorded and is supplied through the recording changeover switch 51 is guided to the second recording head 14 on the rotary cylinder 31 through the second recording amplifier 12 and the second recording rotary-transformer 13 and then recorded onto the magnetic tape 40.

As shown in FIG. 1, the first and second reproducing heads 5 and 15 are mounted on the rotary cylinder 31 and alternatingly make contact with the magnetic tape 40 so as to conduct the reproducing operation thereon simultaneously with the above-mentioned recording operation.

The reproducing changeover switch 61 shown in FIG. 12 is controlled by the reproducing head switch signal 30 which is synchronized with the rotary cylinder 31. During a period when the first reproducing head 5 makes contact with the magnetic tape 40, the reproducing changeover switch 61 is connected to the upper terminal in FIG. 12, and, during a period when the second reproducing head 15 makes contact with the magnetic tape 40, connected to the lower terminal in FIG. 12.

Therefore, during a period when the first reproducing head 5 makes contact with the magnetic tape 40, a signal which has been reproduced by the first reproducing head 5 on the rotary cylinder 31 passes through the first reproducing rotary-transformer 6 and is then amplified by the first reproducing amplifier 7. The amplified signal is supplied to the equalizer 9 through the reproducing changeover switch 61. During a period when the second reproducing head 15 makes contact with the magnetic tape 40, a signal which has been reproduced by the second reproducing head 15 on the rotary cylinder 31 passes through the second reproducing rotary-transformer 16 and is then amplified by the second reproducing amplifier 17. The amplified signal is supplied to the equalizer 9 through the reproducing changeover switch 61.

In the equalizer 9, the frequency characteristics of the system ranging from the recording operation to the reproducing operation are corrected, and the signal is equalized in order to enable digital codes to be discriminated. The equalized signal is supplied to the clock reproducing circuit 22 and an analog-to-digital converter 250.

The clock reproducing circuit 22 generates the recovered clock signal 23 synchronized with the reproduced data, from the equalized signal. The A/D converter 250 samples the equalized signal by means of the recovered clock signal 23 and converts the signal into a digital signal.

The signal which has been digitized in the A/D converter 250 is supplied to a subtractor 208 serving as the operating means. A signal 220 output from the subtractor 208 is supplied to a decoder 221 so that the data codes are subjected to discrimination, and then output as the reproduced data 24 from the discriminant circuit 221. As the discriminant circuit 221, a circuit using a system in which the amplitude is compared with the threshold, or the known Viterbi decoding algorithm is employed may be used.

In the reproducing operation, the signals which are reproduced from the magnetic tape 40 by the first and second reproducing heads 5 and 15 are very weak. The current levels of the reproduced signals are lower by about 70 dB than the recording currents respectively flowing through the first and second recording heads 4 and 14. In the magnetic recording and reproducing apparatus of Embodiment 5, the recording and reproducing heads and the rotary-transformers are proximately disposed on the small rotary cylinder 31 of a diameter of about 20 mm. Consequently, crosstalk in which a recording signal leaks into a reproduced signal occurs in the magnetic recording and reproducing apparatus of Embodiment 5.

The crosstalk from a recording signal to a reproduced signal occurs through many paths. For example, such paths include those from the first or second recording head 4 or 14 to the first or second reproducing head 5 or 15, from the first or second recording rotary-transformer 3 or 13 to the first or second reproducing rotary-transformer 6 or 16, and from wirings between the recording rotary-transformers and the recording heads to wirings between the reproducing rotary-transformers and the reproducing heads. However, crosstalk components which finally leak into the output signal of the equalizer 9 through these many paths can be deemed as a signal which is obtained by convoluting a specific impulse response into the recording data 1. Therefore, crosstalk components can be artificially generated by convoluting the impulse response into the recording data 1.

Accordingly, the magnetic recording and reproducing apparatus of Embodiment 5 is provided with an adaptive filter 225 serving as the adaptive filtering means. The adaptive filter 225 receives the recording data 1 and is controlled by an error signal 228. The impulse response of the adaptive filter 225 is controlled so as to have characteristics which approximate to the impulse response of crosstalk of the system ranging from the recording data 1 to the output of the equalizer 9. According to this configuration, the output of the adaptive filter 225 is a pseudo crosstalk signal 226 which is artificially generated The pseudo crosstalk signal 226 is expressed in the form of a digital signal.

In the subtractor 208, the pseudo crosstalk signal 226 is subtracted from the output signal of the A/D converter 250, thereby canceling crosstalk components leaking into the reproduced signal. As a result, crosstalk interference is largely reduced.

In an error detector 227 serving as the error detecting means, remaining crosstalk components are detected from the signal 220 which is the output of the subtractor 208 and fed back as the error signal 228 to the adaptive filter 225. Even when the condition of crosstalk is changed in accordance with the rotation phase of the rotary cylinder 31 or by changes in properties due to changes in temperature or with ages of the heads and electrical parts, therefore, the adaptive filter 225 is always controlled so as to have characteristics which approximate to crosstalk in the best manner.

Next, the error detector 227 and the adaptive filter 225 will be mentioned in detail.

Figure 13:
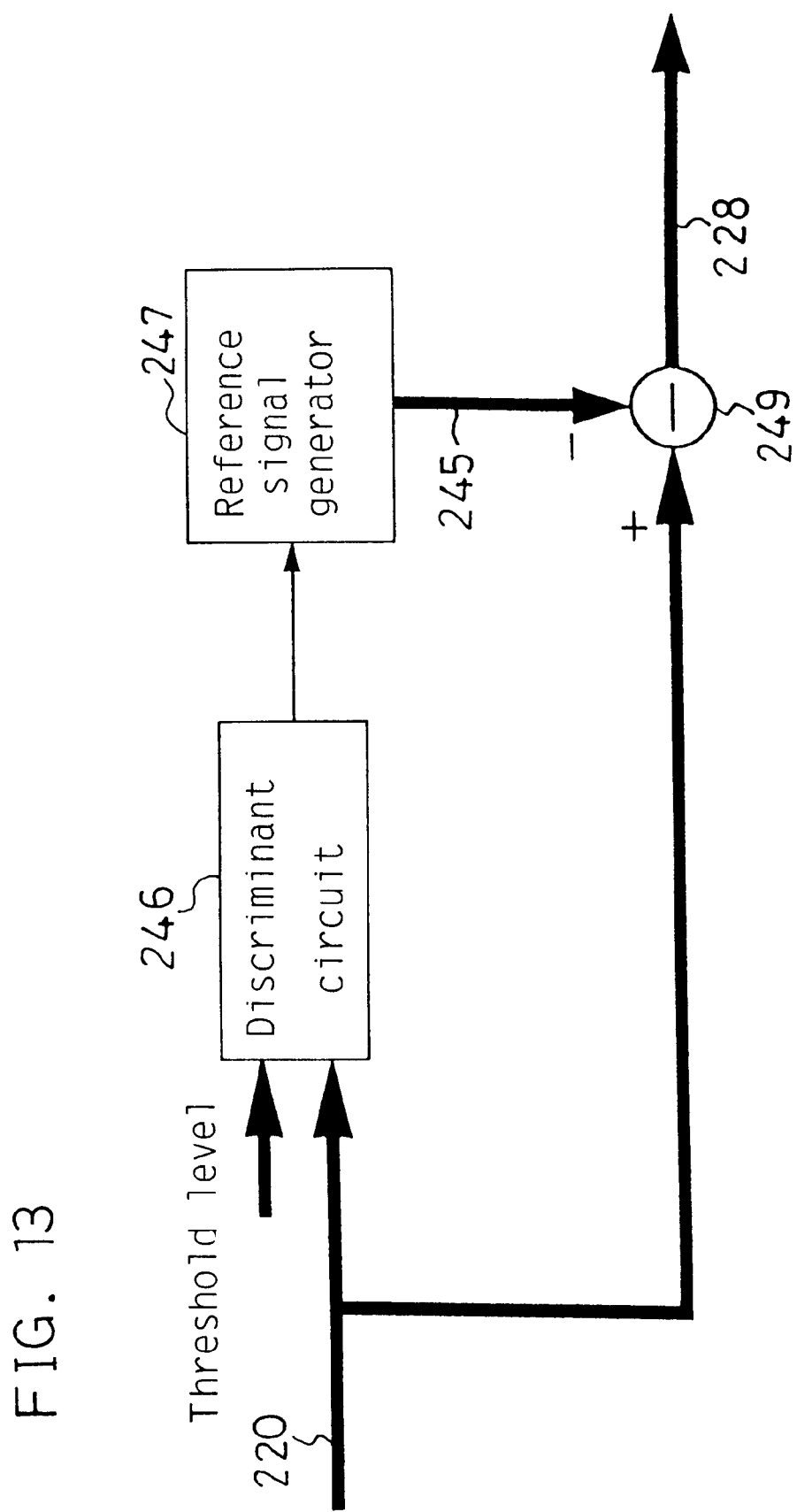
FIG. 13 is a block diagram showing the configuration of an error detector of the magnetic recording and reproducing apparatus of Embodiment 5 of the present invention.

FIG. 13 is a block diagram showing the configuration of the error detector 227. Referring to FIG. 13, a discriminant circuit 246 serving as discriminating means compares the amplitude of the signal 220 with a predetermined threshold level. The comparison result is supplied to a reference signal generator 247. The reference signal generator 247 outputs a reference signal 245 corresponding to the comparison result. A subtractor 249 serving as the operating means subtracts the reference signal 245 from the amplitude of the signal 220, and outputs the subtraction result as the error signal 228.

In the same manner as Embodiment 2 mentioned above, an example of relationships among the eye pattern of the signal 220, the threshold level, and the reference signal 245 will be mentioned with reference to FIG. 6.

FIG. 6 shows the eye pattern in the case where the signal 220 is considered as a continuous signal which has not yet been subjected to the sampling operation. Actually, the signal 220 is a signal which is obtained by digitizing the amplitude at the data discrimination time in FIG. 6. In order to clarify the description, however, the eye pattern in the case where the signal 220 is considered as a continuous signal is shown.

Referring to FIG. 6, ideally, the signal 220 has an amplitude of A or −A at the data discrimination time. As shown in FIG. 6, however, the amplitude of the equalized signal 220 is actually caused not to always coincide with A or −A, by crosstalk from the recording signal or noises entering from the magnetic tape, the head system, and the like.

The threshold level supplied to the discriminant circuit 246 shown in FIG. 13 is set to be an intermediate value between the amplitudes A and −A as shown in FIG. 6. The discriminant circuit 246 compares the amplitude of the threshold level with that of the signal 220 and outputs the comparison result. In accordance with the comparison result of the discriminant circuit 246, the reference signal generator 247 shown in FIG. 13 outputs either of the amplitudes A and −A. Specifically, if the amplitude of the signal 220 is larger than the threshold level, the circuit outputs the amplitude A as the reference signal 245, and, if the amplitude of the signal 220 is smaller than the threshold level, outputs the amplitude −A as the reference signal 245. As a result, the output of the subtractor 249 indicates the error between the amplitude of the signal 220 and the value which the signal should originally have. The output is used as the error signal 228.

Figure 14:
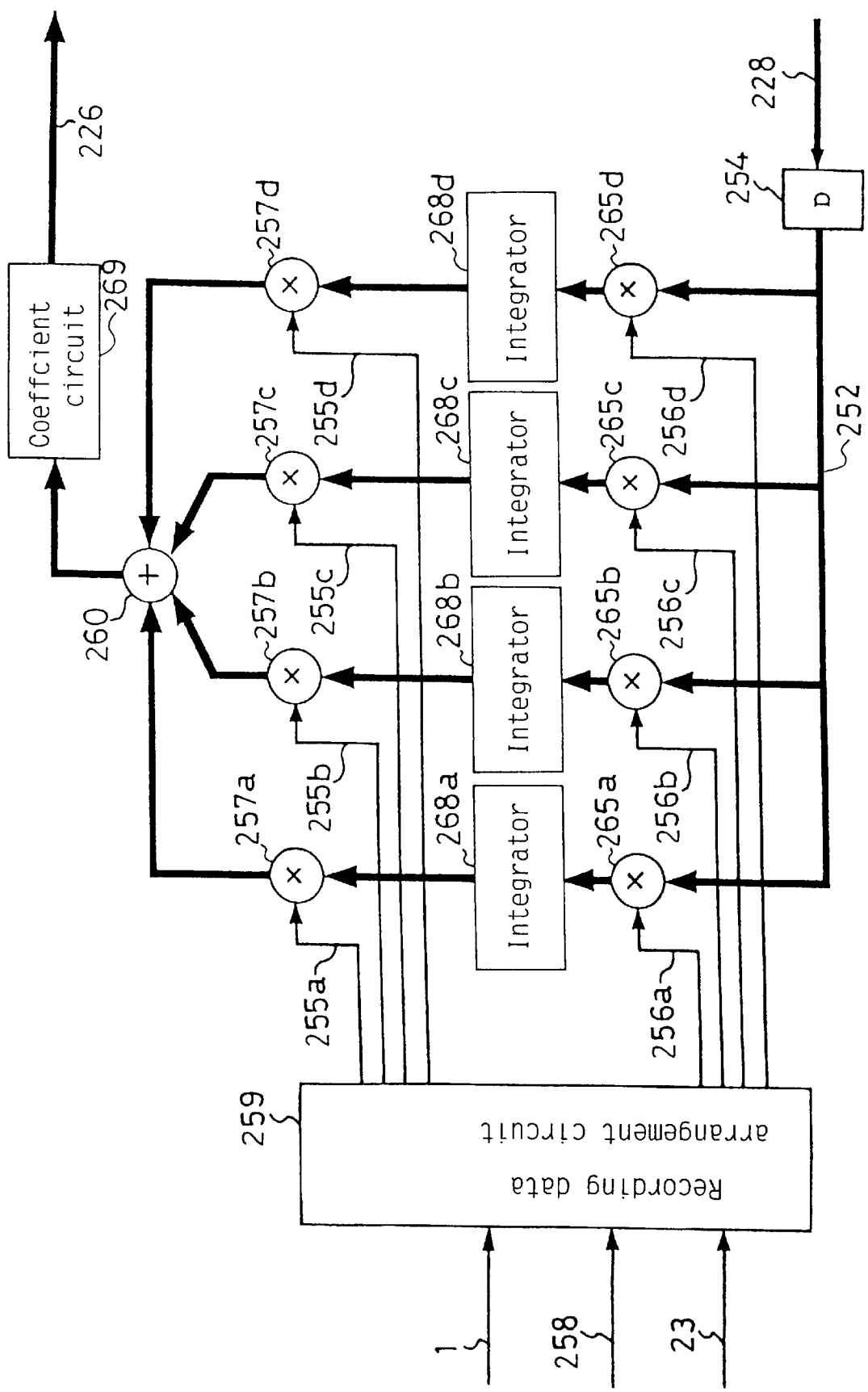
FIG. 14 is a block diagram showing the configuration of an adaptive filter of the magnetic recording and reproducing apparatus of Embodiment 5 of the present invention.

Next, the adaptive filter 225 will be specifically mentioned. FIG. 14 is a block diagram showing the configuration of the adaptive filter 225 of Embodiment 5. The adaptive filter 225 shown in FIG. 14 consists of a 4-tap FIR (Finite Impulse Response) type filter and adaptively operates so that the root mean square of the error signal 228 is always minimum.

Referring to FIG. 14, a recording data arrangement circuit 259 serving as the signal arranging means receives the recording data 1, a recording clock signal 258 synchronized with the recording data 1, and a recovered clock signal 23 synchronized with the reproduced data 24. Signals 255a, 255b, 255c, and 255d output from the recording data arrangement circuit 259 are obtained by making continuous 4-bit signals of the recording data 1 synchronize with the recovered clock signal 23. Signals 256a, 256b, 256c, and 256d output from the recording data arrangement circuit 259 are obtained by synchronizing the recording data 1 which is delayed by M bits from the signals 255a, 255b, 255c, and 255d, with the recovered clock signal 23. When the recording data 1 at time n is indicated by r(n), for example, the signals 255a, 255b, 255c, and 255d at a certain time are r(i), r(i−1), r(i−2), and r(i−3), respectively, and the signals 256a, 256b, 256c, and 256d are r(i−M), r(i−M−1), r(i−M−2), and r(i−M3), respectively. In Embodiment 5, M=1. The configuration of the recording data arrangement circuit 259 will be mentioned later in detail.

In FIG. 14, the reference numerals 265a, 265b, 265c, and 265d designate multipliers, respectively. The four multipliers 265a, 265b, 265c, and 265d constitute the first multiplying means group. A delayed error signal 252 which is obtained by latching the error signal 228 in a D-type flip-flop 254 by means of the recovered clock signal is supplied to one input of each of the multipliers 265a, 265b, 265c, and 265d. The signals 256a, 256b, 256c, and 256d are supplied to the other inputs of the multipliers 265a, 265b, 265c, and 265d, respectively. Each of the signals 256a, 256b, 256c, and 256d is a 1-bit signal indicative of "0" or "1." The multiplication is conducted while assuming that the signals indicate "−1" or "1."

The reference numerals 268a, 268b, 268c, and 268d of FIG. 14 designate integrators serving as the integrating means. The integrators 268a, 268b, 268c, and 268d integrate the output signals of the multipliers 265a, 265b, 265c, and 265d and output the integration results, respectively.

Figure 15:
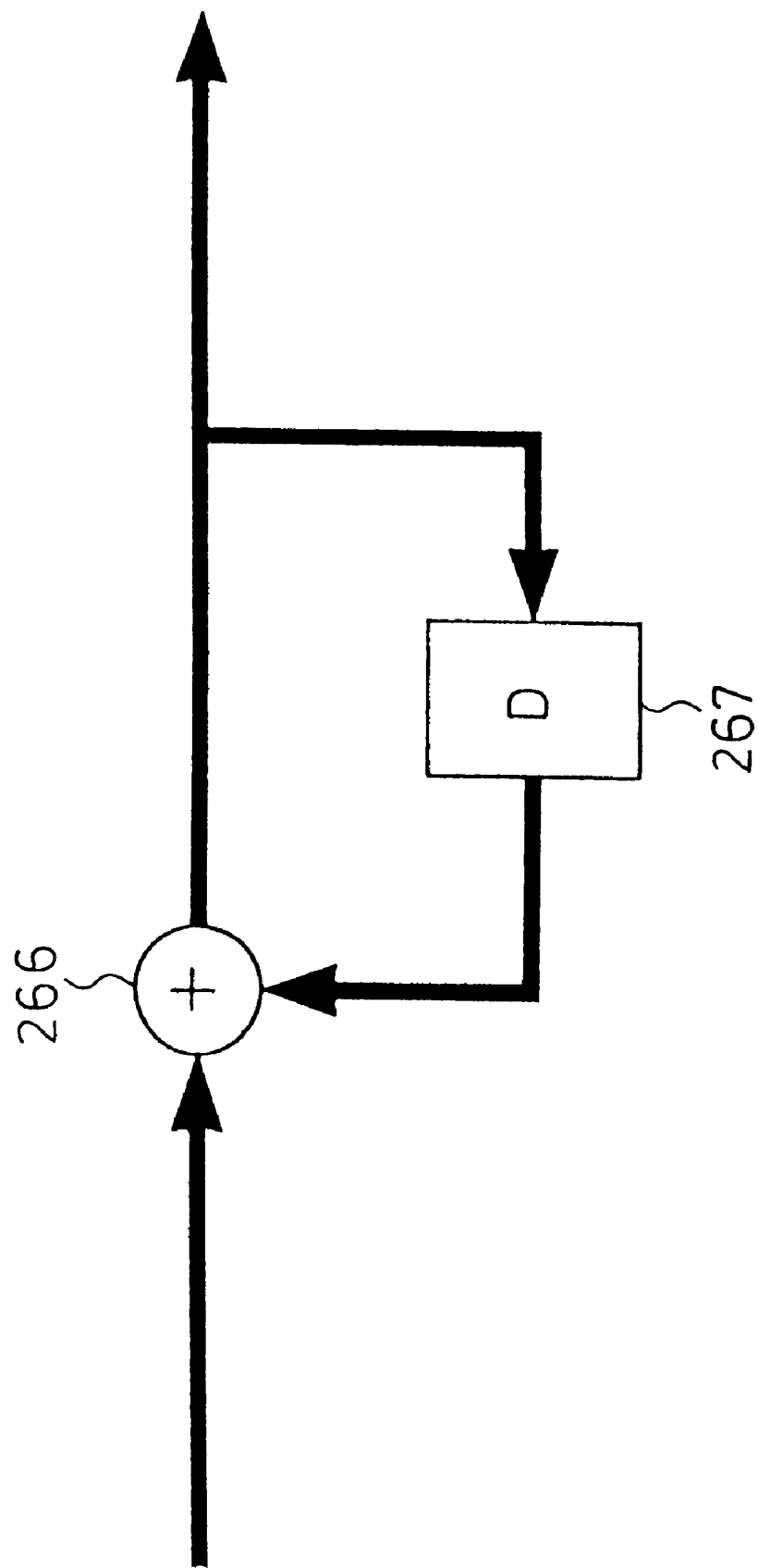
FIG. 15 is a block diagram showing the configuration of an integrator of the magnetic recording and reproducing apparatus of Embodiment 5 of the present invention.

FIG. 15 is a block diagram showing the configuration of the integrator 268a. As shown in FIG. 15, the integrator 268a consists of an adder 266 and a D-type flip-flop 267. Although not illustrated, the recovered clock signal 23 is supplied as a clock signal to the D-type flip-flop 267. The output signal of the adder 266 is delayed by one clock period and then fed back to the adder 266. According to this configuration, the signal supplied to the integrator 268a is accumulated at each clock pulse so that integration is conducted. The other integrators 268b, 268c, and 268d are configured in the strictly same manner as the integrator 268a shown in FIG. 15.

In FIG. 14, reference numerals 257a, 257b, 257c, and 257d designate multipliers. The four multipliers 257a, 257b, 257c, and 257d constitute the second multiplying means group. The signals 255a, 255b, 255c, and 255d are supplied to inputs of one side of the multipliers 257a, 257b, 257c, and 257d, respectively, and the outputs of the integrators 268a, 268b, 268c, and 268d are supplied to the other inputs of the multipliers 257a, 257b, 257c, and 257d, respectively. Each of the signals 255a, 255b, 255c, and 255d is a 1-bit signal indicative of "0" or "1." The multiplication is conducted while assuming that the signals indicate "−1" or "1."

The outputs of the multipliers 257a, 257b, 257c, and 257d are supplied to an adder 260 which serves as the operating means, and the total sum of the signals is supplied to a coefficient circuit 269. In the coefficient circuit 269, a predetermined coefficient α is multiplied with the output signal of the adder 260, and the multiplication result is output as the pseudo crosstalk signal 226.

In Embodiment 5, the error signal 228 is not directly supplied to the multipliers 265a, 265b, 265c, and 265d, and the delayed error signal 252 which is obtained by latching the error signal in the D-type flip-flop 254 by means of the recovered clock signal is supplied to the multipliers. This configuration is employed because the system for obtaining the error signal 228 is configured by a feedback loop as shown in FIGS. 12, 13, and 14 and a delay time due to the circuits in the feedback loop is absorbed by conducting the latching operation using the recovered clock signal.

As mentioned above, the signals 256a, 256b, 256c, and 256d output from the recording data arrangement circuit 259 are obtained by synchronizing the recording data which lags by M bits behind the signals 255a, 255b, 255c, and 255d, with the recovered clock signal 23. The value of M is equal to the delay time of the system ranging from the signal 255a to the delayed error signal 252 supplied to the multiplier 265a, through the pseudo crosstalk signal 226, the subtractor 208, the error detector 227, etc. In Embodiment 5, the delay time of the system is equal to one clock period due to the D-type flip-flop 254, and hence M =1.

As mentioned above, a 1-bit signal indicative of "0" or "1" is supplied to the one input of each of the multipliers 265a, 265b, 265c, and 265d and 257a, 257b, 257c, and 257d. Therefore, each of these multipliers can be realized by a switch circuit which switches over the manners of the output operation, i.e., the output operation in which the other input is output as it is, or that in which the other input is inverted and then output, depending on the code of the 1-bit signal supplied to the one input.

Next, the principle in which the pseudo crosstalk signal 226 generated in the adaptive filter 225 shown in FIG. 14 adaptively operates so as to optimally approximate to the crosstalk signal leaking into the reproduced signal will be mentioned with using expressions. In the following description, a signal at time i (i is an integer) is dealt (in the following expressions, a suffix i is attached to the signal).

The signal component included in the signal 220 is indicated by s, crosstalk components leaking from the recording signal into the signal 220 by x, and the noise components from the tape and the like by n. The pseudo crosstalk signal 226 is indicated by y. The value $v_i$ of signal 220 at time i can be shown by the following expression where suffixes i indicate values at the time i:

$$v_i = s_i + x_i + n_i - y_i \quad (7)$$

When the error signal 228 is indicated by e and it is assumed that the reference signal 245 obtained in the reference signal generator 247 of the error detector 227 shown in FIG. 13 is equal to s, e can be shown by the following expression where suffixes i indicate values at the time i:

$$e_i = x_i - y_i + n_i \quad (8)$$

If both sides of expression (8) are squared, the following is held:

$$e_i^2 = (x_i - y_i)^2 + 2(x_i - y_i)n_i + n_i^2 \quad (9)$$

In order that the pseudo crosstalk signal 226 optimally approximates to crosstalk components leaking into the reproduced signal in the meaning of minimizing the root mean square error, the characteristics of the adaptive filter 225 are changed so that the average of the first term of the right side of expression (9) with respect to time i is minimum. When the averages of both sides of expression (9) with respect to time i are considered, the average of the second term of the right side is zero because the average of the noise components n is zero. The third term of the right side is independent from the pseudo crosstalk signal y. When the time average of expression (9) is set to be minimum, therefore, this results in that the pseudo crosstalk signal 226 optimally approximates to the crosstalk signal leaking into the reproduced signal.

When the outputs of the integrators 268a, 268b, 268c, and 268d are indicated by $C_j$ (j=0, 1, 2, and 3), $C_j$ indicates the impulse response of the adaptive filter 225. When the recording data 1 is indicated by r, the pseudo crosstalk signal y which is the output of the adaptive filter at time i is shown by the following expression where $r_i$ indicates the recording data at time i:

$$y_i = \sum_j C_j \cdot r_{i-j} \quad (10)$$

At this time, in order to update the tap coefficient $C_j$ so that the time average of expression (9) is minimum, updation is conducted at any time in accordance with the following expression:

$$Cj \rightarrow Cj - \alpha \cdot \frac{\partial e_i^2}{\partial Cj} \quad (11)$$

where α is a constant for determining the convergence speed and used in the multiplication in the coefficient circuit 269.

Substituting expressions (8) and (10) in expression (11), following expression (12) is obtained:

$$Cj \rightarrow Cj + 2\alpha \cdot r_{i-j} \cdot e_i \quad (12)$$

Actually, the error signal 228 is not used, and instead the delayed error signal 252 which is obtained by delaying the error signal by M clock pulses is used (in the embodiment, M =1). Therefore, following expression (13) is used in place of expression (12):

$$Cj \rightarrow Cj + 2\alpha \cdot r_{i-j-M} \cdot e_{i-M} \quad (13)$$

From expression (13), it will be noted that the tap coefficient $C_j$ can be obtained by appropriately time-integrating a product of the delayed error signal 252 which is delayed from time i by M clock pulses and the recording data at time i−j−M.

The adaptive filter 225 shown in FIG. 14 is a specific realization of the above In the adaptive filter 225, therefore, its characteristics are adaptively changed so that the pseudo crosstalk signal 226 always optimally approximates to the crosstalk signal leaking into the reproduced signal in the meaning of minimizing the root mean square error.

As a result, as shown in FIG. 12, the pseudo crosstalk signal 226 is subtracted in the subtractor 208 from the signal 220, whereby crosstalk components leaking into the reproduced signal is canceled so as to be largely reduced.

Next, the recording data arrangement circuit 259 will be mentioned in more detail.

The recording data 1 is synchronized with the recording clock signal 258 of a period which is not varied or is stable. On the other hand, the time axes of the reproduced data 24 and the recovered clock signal 23 synchronized therewith are varied by rotation variation of the rotary cylinder 31 or the like. Therefore, the recording clock signal 258 and the recovered clock signal 23 are equal to each other in average frequency but the phase relationship between the clock signals are always varied.

In order to subtract the pseudo crosstalk signal 226 from the output signal of the A/D converter 250 to cancel crosstalk components as shown in FIG. 12, the pseudo crosstalk signal 226 must be synchronized with the reproduced data 24. To comply with this, as mentioned above, the recording data arrangement circuit 259 receives the recording data 1, the recording clock signal 258, and the recovered clock signal 23, outputs continuous 4-bit signals of the recording data 1 as the signals 255a, 255b, 255c, and 255d in synchronization with the recovered clock signal 23, and outputs the recording data 1 which is delayed from the signals 255a, 255b, 255c, and 255d by M bits, as the signals 256a, 256b, 256c, and 256d in synchronization with the recovered clock signal 23. In order to enable crosstalk to be stably reduced even when the phase relationship between the recording clock signal 258 and the recovered clock signal 23 is varied, the apparatus has also a function of rotating the arrangement of continuous 4-bit signals in accordance with the variation in phase relationship.

Figure 16:
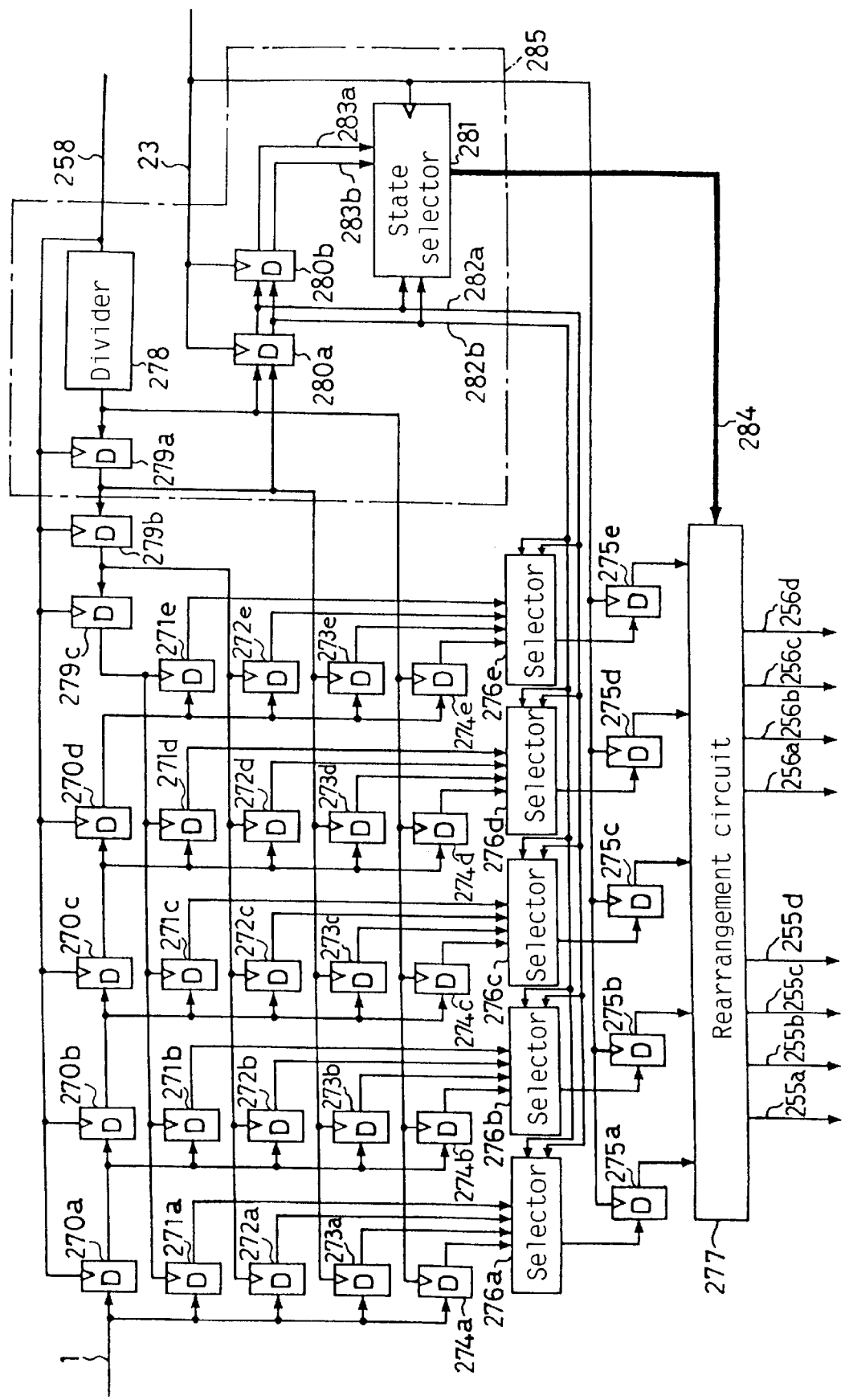
FIG. 16 is a block diagram showing the configuration of a recording signal arrangement circuit of the magnetic recording and reproducing apparatus of Embodiment 5 of the present invention.

Next, the configuration of the recording data arrangement circuit 259 shown in FIG. 14 will be specifically mentioned with reference to FIG. 16.

FIG. 16 is a block diagram showing the configuration of the recording signal arrangement circuit 259. In FIG. 16, 278 designates a four-frequency divider which divides by four the frequency of the recording clock signal 258, and 279a, 279b, and 279c designate D-type flip-flops (hereinafter, such a flip-flop is abbreviated as "D-FF"). The output of the four-frequency divider 278 is sequentially delayed by the D-FFs 279a, 279b, and 279c by means of the recording clock signal 258.

The reference numerals 270a, 270b, 270c, and 270d designate D-FFs which use the recording clock signal 258 as a clock signal The D-FFs 270a, 270b, 270c, and 270d sequentially delay the recording data 1.

The reference numerals 274a, 274b, 274c, 274d, and 274e designate D-FFs which use the output of the four-frequency divider 278 as a clock signal. The D-FFs 274a, 274b, 274c, 274d, and 274e receive the recording data 1, and the output signals of the D-FFs 270a, 270b, 270c, and 270d, respectively Similarly, the reference numerals 273a, 273b, 273c, 273d, and 273e designate D-FFs which use the output of the D-FF 279a as a clock signal The D-FFs 273a, 273b, 273c, 273d, and 273e receive the recording data 1, and the output signals of the D-FFs 270a, 270b, 270c, and 270d, respectively The reference numerals 272a, 272b, 272c, 272d, and 272e designate D-FFs which use the output of the D-FF 279b as a clock signal The D-FFs 272a, 272b, 272c, 272d, and 272e receive the recording data 1, and the output signals of the D-FFs 270a, 270b, 270c, and 270d, respectively. The reference numerals 271a, 271b, 271c, 271d, and 271e designate D-FFs which use the output of the D-FF 279c as a clock signal. The D-FFs 271a, 271b, 271c, 271d, and 271e receive the recording data 1, and the output signals of the D-FFs 270a, 270b, 270c, and 270d, respectively.

In FIG. 16, 280a designates a 2-bit D-FF which uses the recovered clock signal 23 as a clock signal. The D-FF 280a functions as latching means for receiving the outputs of the four-frequency divider 278 and the D-FF 279a, latching the outputs by means of the recovered clock signal 23, and outputting signals 282a and 282b. The reference numeral 280b designates a 2-bit D-FF which uses the recovered clock signal 23 as a clock signal. The D-FF 280b functions as delaying means for delaying the signals 282a and 282b by means of the recovered clock signal 23, and outputting signals 283a and 283b.

A state selector 281 outputs a state signal 284 at the timing of the recovered clock signal 23, in accordance with the signals 282a, 282b, 283a, and 283b. The state selector 281 functions as phase change detecting means as mentioned later.

The unit consisting of the four-frequency divider 278, the D-FFs 279a, 280a, and 280b, and the state selector 281 constitutes a clock phase detector 285 serving as clock phase detecting means for detecting the phase relationship between the recording clock signal 258 and the recovered clock signal 23.

A selector 276a receives the output signals of the D-FFs 271a, 272a, 273a, and 274a, and selectively outputs one of the four input signals in accordance with the signals 282a and 282b. Similarly, a selector 276b receives the output signals of the D-FFs 271b, 272b, 273b, and 274b, and selectively outputs one of the four input signals in accordance with the signals 282a and 282b. A selector 276c receives the output signals of the D-FFs 271c, 272c, 273c, and 274c, and selectively outputs one of the four input signals in accordance with the signals 282a and 282b. A selector 276d receives the output signals of the D-FFs 271d, 272d, 273d, and 274d, and selectively outputs one of the four input signals in accordance with the signals 282a and 282b. Furthermore, a selector 276e receives the output signals of the D-FFs 271e, 272e, 273e, and 274e, and selectively outputs one of the four input signals in accordance with the signals 282a and 282b.

In FIG. 16, 275a, 275b, 275c, 275d, and 275e designate D-FFs which uses the recovered clock signal 23 as a clock signal The D-FFs 275a, 275b, 275c, 275d, and 275e receive the output signals of the selectors 276a, 276b, 276c, 276d, and 276e, respectively.

A rearrangement circuit 277 receives the output signals of the D-FFs 275a, 275b, 275c, 275d, and 275e, rearranges the signals in accordance with the state signal 284, and outputs the signals 255a, 255b, 255c, and 255d, and 256a, 256b, 256c, and 256d. The rearrangement circuit 277 functions as rearranging means.

Figure 17:
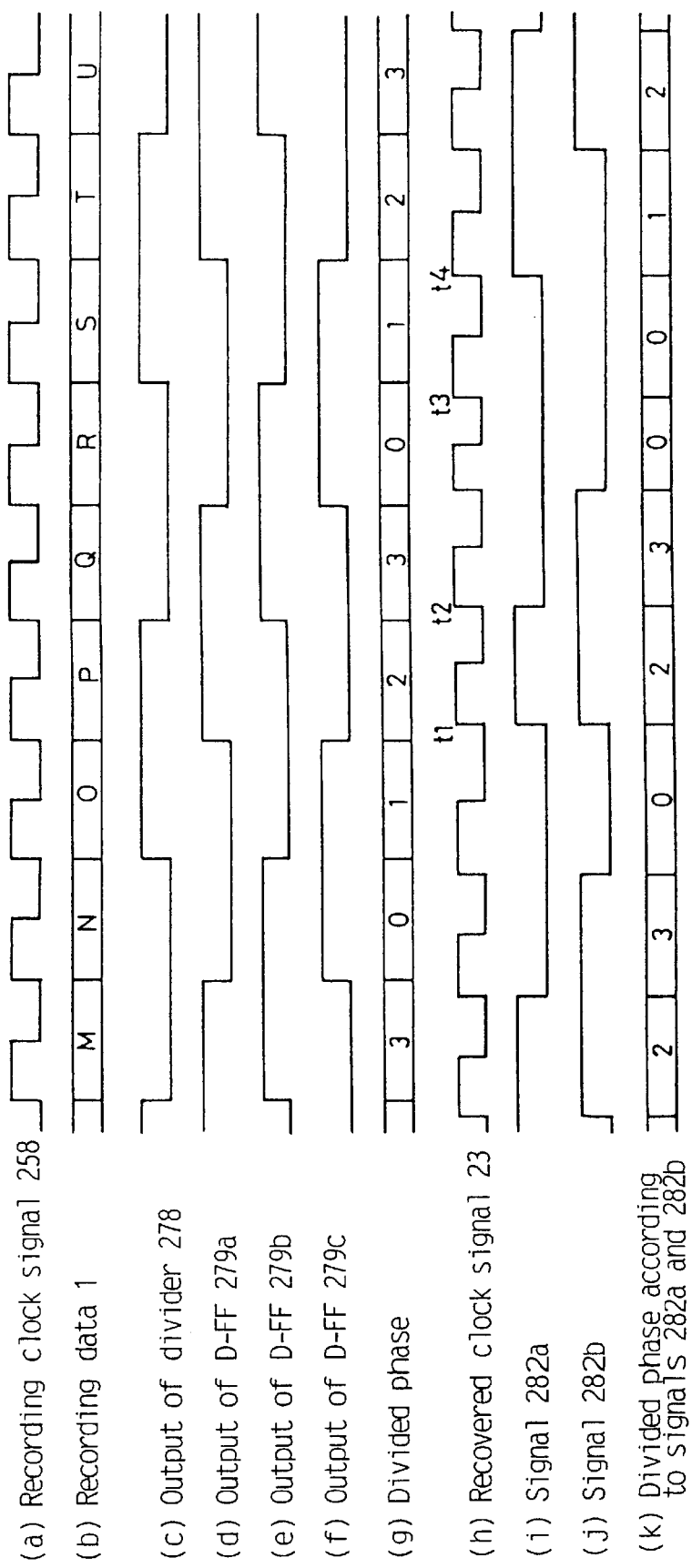
FIG. 17 is a timing chart illustrating the operation of the recording signal arrangement circuit of the magnetic recording and reproducing apparatus of Embodiment 5 of the present invention.
Figure 18:
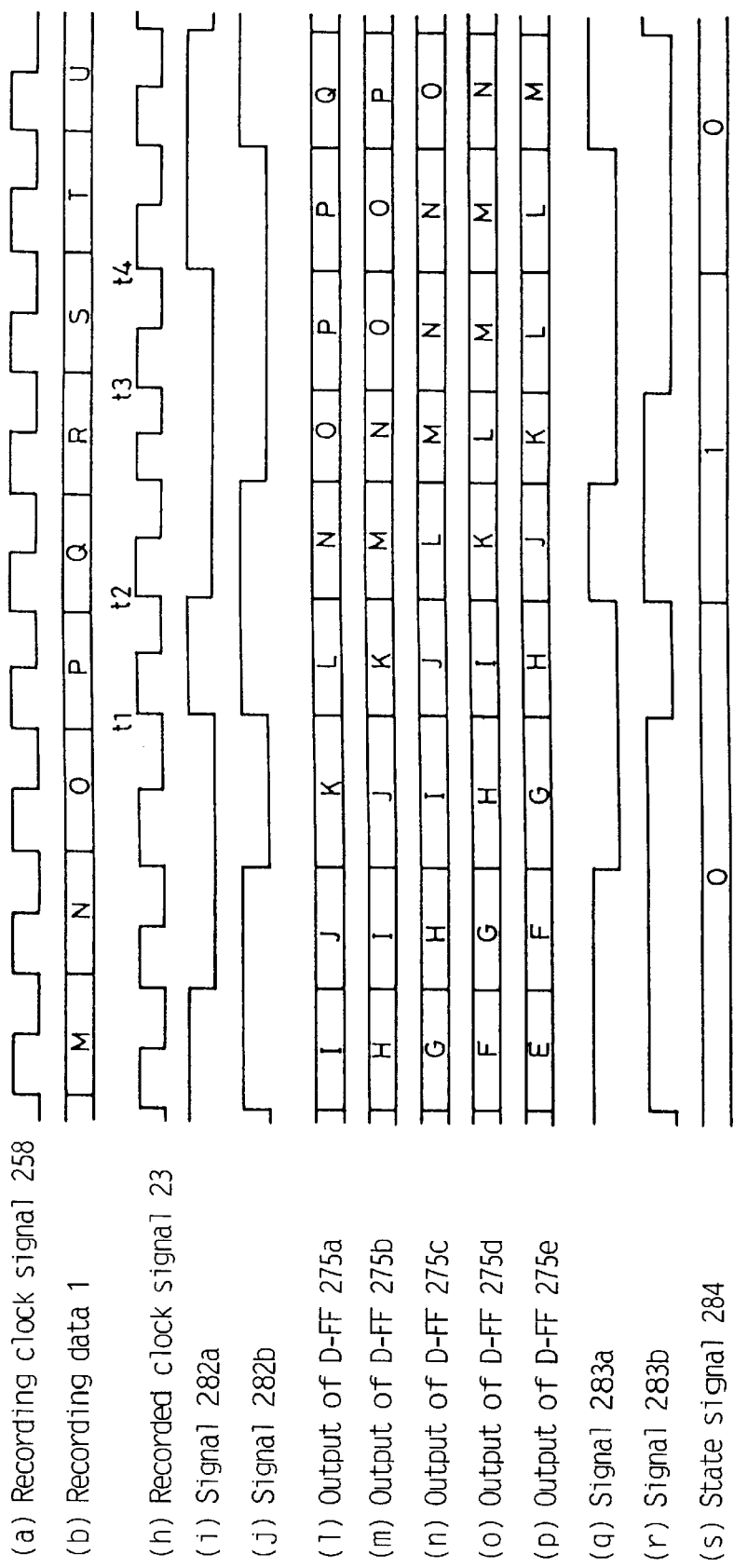
FIG. 18 is a timing chart illustrating the operation of the recording signal arrangement circuit of the magnetic recording and reproducing apparatus of Embodiment 5 of the present invention.
Figure 20:
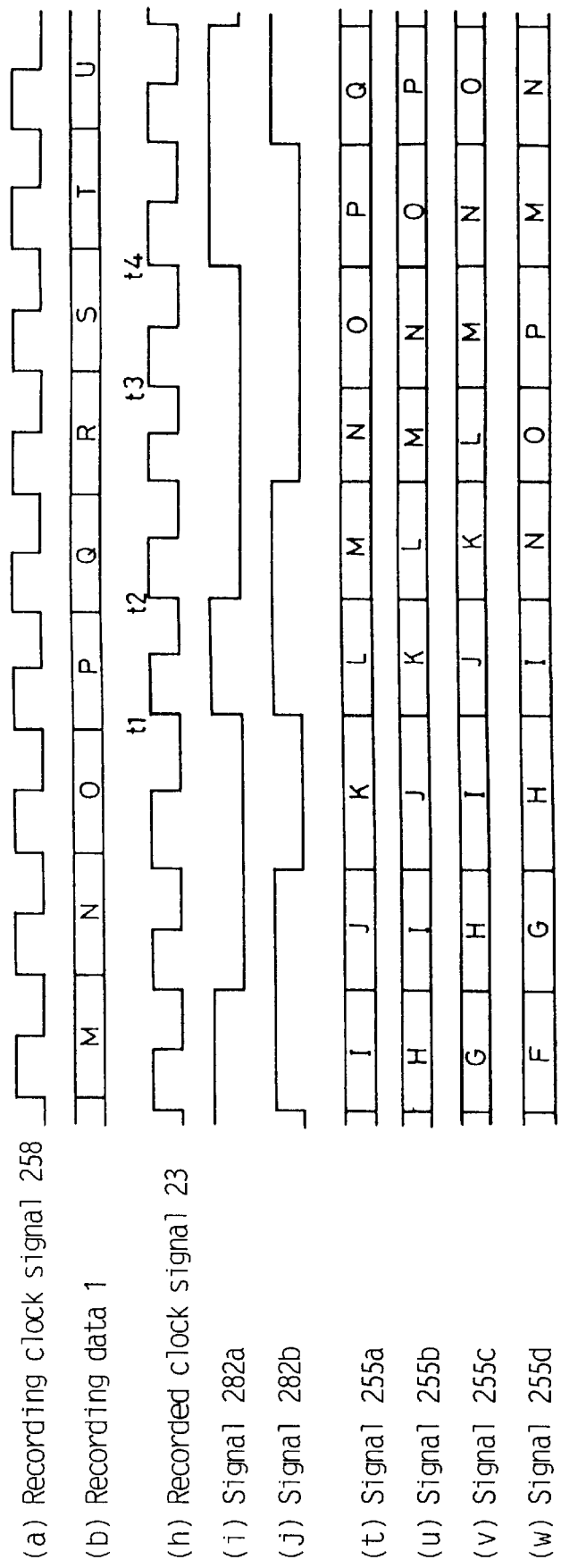
FIG. 20 is a timing chart illustrating the operation of the recording signal arrangement circuit of the magnetic recording and reproducing apparatus of Embodiment 5 of the present invention.

Next, the operation of the recording signal arrangement circuit 259 shown in FIG. 16 will be mentioned with reference to FIGS. 17, 18, and 20.

FIGS. 17, 18, and 20 are timing charts showing signals of various portions of the recording signal arrangement circuit 259 of FIG. 16. In FIG. 17, (a) shows the recording clock signal 258, (b) shows the recording data 1 input in the sequence of A, B, C, . . . , (c) shows the signal which has been subjected to the frequency division in the four-frequency divider 278, and (d), (e), and (f) respectively show the signals which are obtained by delaying the output signal of the four-frequency divider 278 in the D-FFs 279a, 279b, and 279c, respectively.

The H level of a signal is indicated by "1" and the L level by "0." When the combination of the output signal of the four-frequency divider 278 and that of the D-FF 279a is indicated in the form of (the output signal of the four-frequency divider 278, the output signal of the D-FF 279a), the combination is repeated in the sequence of (0, 0), (1, 0), (1, 1), (0, 1), (0, 0) . . . , or constitutes a Gray code in which only 1 bit of 2 bits has a different value in adjacent zones In other words, the four-frequency divider 278 and the D-FF 279a function as frequency dividing means for converting the divided phase into a Gray code and then outputting the Gray code. In (g) of FIG. 17, the states of (0, 0), (1, 0), (1, 1), (0, 1) are indicated by the divided phases of "0," "1," "2," and "3," respectively.

As mentioned above, the period of the recovered clock signal 23 is varied by rotation variation of the rotary cylinder or the like. As shown in (h) of FIG. 17, the phase relationship between the rising timing of the recovered clock signal 23 and the recording clock signal 258 is changed at times t1 and t3. Therefore, the signals 282a and 282b which are obtained by latching the output signals of the four-frequency divider 278 and the D-FF 279a by means of the recovered clock signal 23 are signals shown in (i) and (j) of FIG. 17, respectively. The divided phase of the signals 282a and 282b which is indicated in the form of a Gray code is not continuously changed in the sequence of "0," "1," "2," "3," "0," "1," . . . , but is discontinuous at times t1 and t3.

The divided phase is recognized on the basis of the signals 282a and 282b which are obtained by latching the output signals of the four-frequency divider 278 and the D-FF 279a by means of the recovered clock signal 23. As mentioned above, these 2 bits are expressed as a result of converting the divided phase into a Gray code. The reason why a Gray code is used is that, even when the 2 bits are delicately shifted in timing from each other, the phase is prevented from being erroneously detected because only 1 bit of the 2 bits has a different value in adjacent zones.

When the divided phase indicated by the signals 282a and 282b is "0," the selector 276a in FIG. 16 selectively outputs the output of the D-FF 272a. The selected signal is latched in the D-FF 275a at the rising timing of the recovered clock signal 23. When the period of the recording clock signal 258 is indicated by T, the rising timing of the output of the D-FF 279b shown in (e) of FIG. 17 leads by 1T to 2T the timing when the divided phase indicated by the signals 282a and 282b shown in (k) of FIG. 17 is changed to "0." When the selector 276a selects the output of the D-FF 272a, therefore, the output of the D-FF 272a which uses the output of the D-FF 279b as a clock signal can be surely latched in the D-FF 275a by means of the recovered clock signal 23.

When the divided phase indicated by the signals 282a and 282b is "1," the selector 276a selectively outputs the output of the D-FF 271a, when the phase is "2," selectively outputs the output of the D-FF 274a, and, when the phase is "3," selectively outputs the output of the D-FF 273a. According to this configuration, the recording data can be surely synchronized with the recovered clock signal 23 in the D-FF 275a irrespective of the phase relationship between the recording clock signal 258 and the recovered clock signal 23 in which the period is varied.

Also the selectors 276b to 276e operate in the same manner as the selector 276a.

As a result of the above-mentioned operations, even when the recovered clock signal 23 is varied, the D-FFs 275a to 275e output the 5-bit recording data which is always continuous at any time in synchronization with the recovered clock signal 23, as shown in (l) to (p) of FIG. 18.

When the output sequence of the D-FF 275b shown in (m) of FIG. 18 is seen in the time axis, for example, data is discontinuous at times t2 and t4. If the signals shown in (l) to (o) of FIG. 18 are output as they are as the signals 255a to 255d, therefore, the value of the impulse response of crosstalk which is to be output from the integrators 268a to 268d of FIG. 14 is discontinuous at times t2 and t4, with the result that a large error is produced in the pseudo crosstalk signal 226.

However this, in FIG. 16, the state selector 281 functions as phase change detecting means, and the rearrangement circuit 277 functions as rearranging means, thereby conducting processing so that, even when the phase relationship between the recording clock signal 258 and the recovered clock signal 23 is changed, a large error is not produced in the pseudo crosstalk signal 226 of FIG. 14.

Next, the operations of the state selector 281 and the rearrangement circuit 277 will be specifically mentioned.

In FIG. 18, (q) and (r) show the signals 283a and 283b, respectively When the signal 282a shown in (i) of FIG. 18 is compared with the signal 283a shown in (q) or the signal 282b shown in (j) of FIG. 18 is compared with the signal 283b shown in (r), both the comparison results indicate difference in the time period between times t1 and t2, and equality in the time period between times t3 and t4. In the other time periods, only one of the two comparisons results indicate difference. As seen from the above, the change of the phase relationship between the recording clock signal 258 and the recovered clock signal 23 can be known from the result of comparison between the signals 282a and 283a and that of comparison between the signals 282b and 283b.

Figure 19:
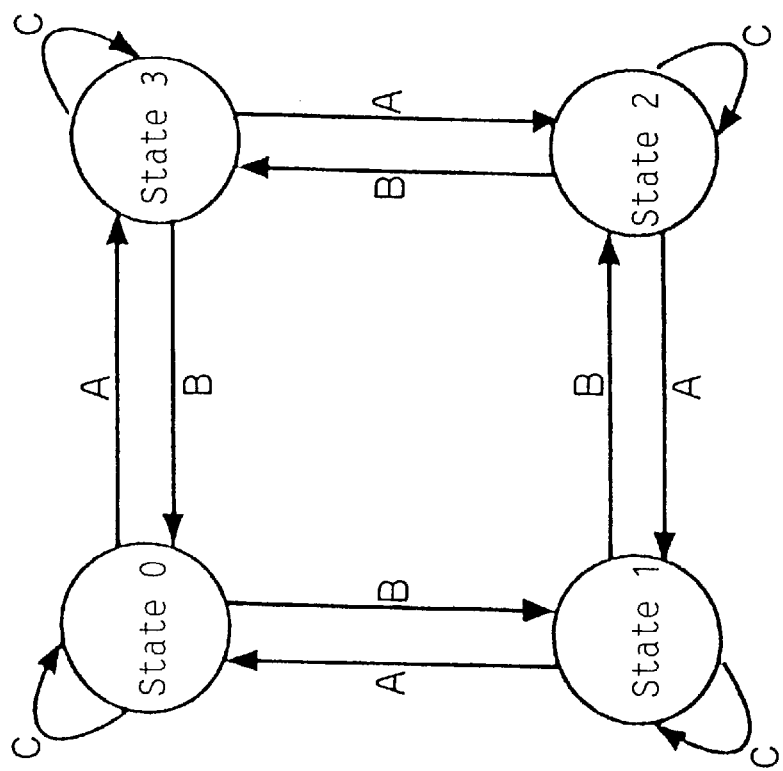
FIG. 19 is a state transition diagram illustrating the operation of the recording signal arrangement circuit of the magnetic recording and reproducing apparatus of Embodiment 5 of the present invention.

By using the above, the state selector 281 of FIG. 16 holds one of the four states "0," "1," "2," and "3" and outputs the state signal 284. FIG. 19 is a state transition diagram illustrating the relationships among 4. the four states "0," "1," "2," and "3" of the state selector 281.

In FIG. 19, an event in which the signals 282a and 283a are equal to each other and also the signals 282b and 283b are equal to each other is indicated by A, an event in which the signals 282a and 283a are different from each other and also the signals 282b and 283b are different from each other is indicated by B, and events other than the events A and B are indicated by C. In other words, an event in which both the comparison results indicate equality is indicated by A, an event in which both the comparison results indicate difference is indicated by B, and an event in which only one of the comparison results indicate difference is indicated by C. The state held by the state selector 281 changes as shown in FIG. 19. In (s) of FIG. 18, the manner of changing the state indicated by the state signal 284 is shown.

When the state signal 284 indicates state "0," the rearrangement circuit 277 shown in FIG. 16 outputs the output signals of the D-FFs 275a, 275b, 275c, and 275d as the signals 255a, 255b, 255c, and 255d, and those of the D-FFs 275b, 275c, 275d, and 275e as the signals 256a, 256b, 256c, and 256d, respectively. When the state signal 284 indicates state "1," the circuit outputs the output signals of the D-FFs 275b, 275c, 275d, and 275e as the signals 255a, 255b, 255c, and 255d, and those of the D-FFs 275c, 275d, 275e, and 275b as the signals 256a, 256b, 256c, and 256d, respectively. When the state signal 284 indicates state "2," the circuit outputs the output signals of the D-FFs 275c, 275d, 275a, and 275b as the signals 255a, 255b, 255c, and 255d, and those of the D-FFs 275d, 275e, 275b, and 275c as the signals 256a, 256b, 256c, and 256d, respectively. When the state signal 284 indicates state "3," the circuit outputs the output signals of the D-FFs 275d, 275a, 275b, and 275c as the signals 255a, 255b, 255c, and 255d, and those of the D-FFs 275e, 275b, 275c, and 275d as the signals 256a, 256b, 256c, and 256d, respectively.

The manner of changes of the signals 256a, 256b, 256c, and 256d which are obtained as a result of the above-mentioned rearrangement operations are shown in (t), (u), (v), and (w) of FIG. 20. As shown in FIG. 20, when the changes of the signals are seen in the direction of the time axis, there occurs no discontinuity between the signal 255b shown in (u) and the signal 255c shown in (v). As seen from this example, with respect to the center 2 data of the continuous 4 data of the recording data, their continuity is maintained even when the phase relationship between the recording clock signal 258 and the recovered clock signal 23 is changed. Although not illustrated, the above is applicable also to the signals 256a, 256b, 256c, and 256d.

With respect to the absolute values of the impulse responses of crosstalk which are to be output from the integrators 268a to 268d shown in FIG. 14, generally, the value of the center of the impulse responses for continuous 4 data is larger and the value becomes smaller as moving toward the ends. Even when an error due to discontinuity occurs in the impulse responses for the ends, therefore, an error occurring in the pseudo crosstalk signal 226 is small in degree as far as the continuity of the other portions including the center is maintained.

As mentioned above, the recording signal arrangement circuit 259 outputs continuous data of 4 bits of the recording data 1 as the signals 255a, 255b, 255c, and 255d in synchronization with the recovered clock signal 23, and outputs recording data which lag behind the signals 255a, 255b, 255c, and 255d by M bits (in the embodiment, M=1) as the signals 256a, 256b, 256c, and 256d in synchronization with the recovered clock signal 23. Furthermore, the recording signal arrangement circuit has also a function that the signal arrangement is changed by rotating the arrangement of continuous 4 bit signals in accordance with the change in phase relationship, so that the pseudo crosstalk signal 226 is stably obtained even when the phase relationship between the recording clock signal 258 and the recovered clock signal 23 is changed.

The operation of changing the signal arrangement will be mentioned by using more general terms.

The signals 255a, 255b, 255c, and 255d are indicated by {q[0], q[1], q[2], q[3]}, and the recording data 1 at time n of the recording clock signal 258 is indicated by r[n]. It is assumed that, when the time of the recording clock signal is n and that of the recovered clock signal is m, r[n−h−i] with q[mod(i+j)] (i=0, 1, 2, 3, j and h are integers, and mod(A) indicates the remainder in the case where the integer A is divided by 4) is output. The signal arrangement is changed so that, when the recording clock signal is n at time m+1 of the recovered clock signal, r[n−h−i] with q[mod(i+j+1)] is output, when the recording clock signal is n+1 at time m+1 of the recovered clock signal, r[n−h−i+1] with q[mod(i+j)] is output, and, when the recording clock signal is n+2 at time m+1 of the recovered clock signal, r[n−h−i+2] with q[mod(i+j−1)] is output. The integer h indicates the delayed time due to the process of synchronizing the recording data 1 with the recovered clock signal 23.

As mentioned above, according to Embodiment 5 of the present invention, although the small rotary cylinder in which separation between the recording and reproduced signals is hardly conducted by electromagnetic means is used, simultaneous reproduction is enabled while crosstalk components are largely cancelled reduced by subtracting the pseudo crosstalk component which is artificially generated, from the reproduced signal, thereby reducing crosstalk interference applied to the reproduced signal.

Furthermore, the pseudo crosstalk signal is always adaptively generated. Even when the condition of crosstalk is changed in accordance with the rotation phase of the rotary cylinder or by changes in properties due to changes in temperature or with ages of the heads and electrical parts, therefore, simultaneous reproduction can be always conducted under the best conditions. Even when the phase relationship between recording data and reproduced data is varied by rotation variation of the rotary cylinder or the like, simultaneous reproduction can be conducted without being affected by such variation.

In Embodiment 5, the case of M=1 has been mentioned because the delay time M of the system ranging from the signal 255a to the delayed error signal 252 supplied to the multiplier 265a, through the pseudo crosstalk signal 226, the subtractor 208, the error detector 227, etc. is only one clock period due to the D-type flip-flop 2540 When D-FFs are disposed in various portions in accordance with the employed data rate and the processing speed of the circuits, M has a larger value. In this case, the recording data arrangement circuit 259 is configured so that the signals 256a, 256b, 256c, and 256d output from the recording data arrangement circuit 259 cause the recording data which lag by M bits behind the signals 255a, 255b, 255c, and 255d to be output with being synchronized with the recovered clock signal 23.

Embodiment 5 is an example in which the adaptive filtering means is configured by a 4-tap FIR type filter. The present invention is not restricted to this. When the number of taps is further increased, for example, it is possible to more correctly approximate crosstalk components, with the result that the effect of reducing crosstalk can be further enhanced.

In Embodiment 5, the adaptive filtering means (225), the operating means (208), the error detecting means (227), etc. are executed so as to conduct digital processing. Alternatively, such means may be executed so as to conduct analog processing. Also in the alternative, the same effects as those of the embodiment can be attained.

Embodiment 6

Figure 21:
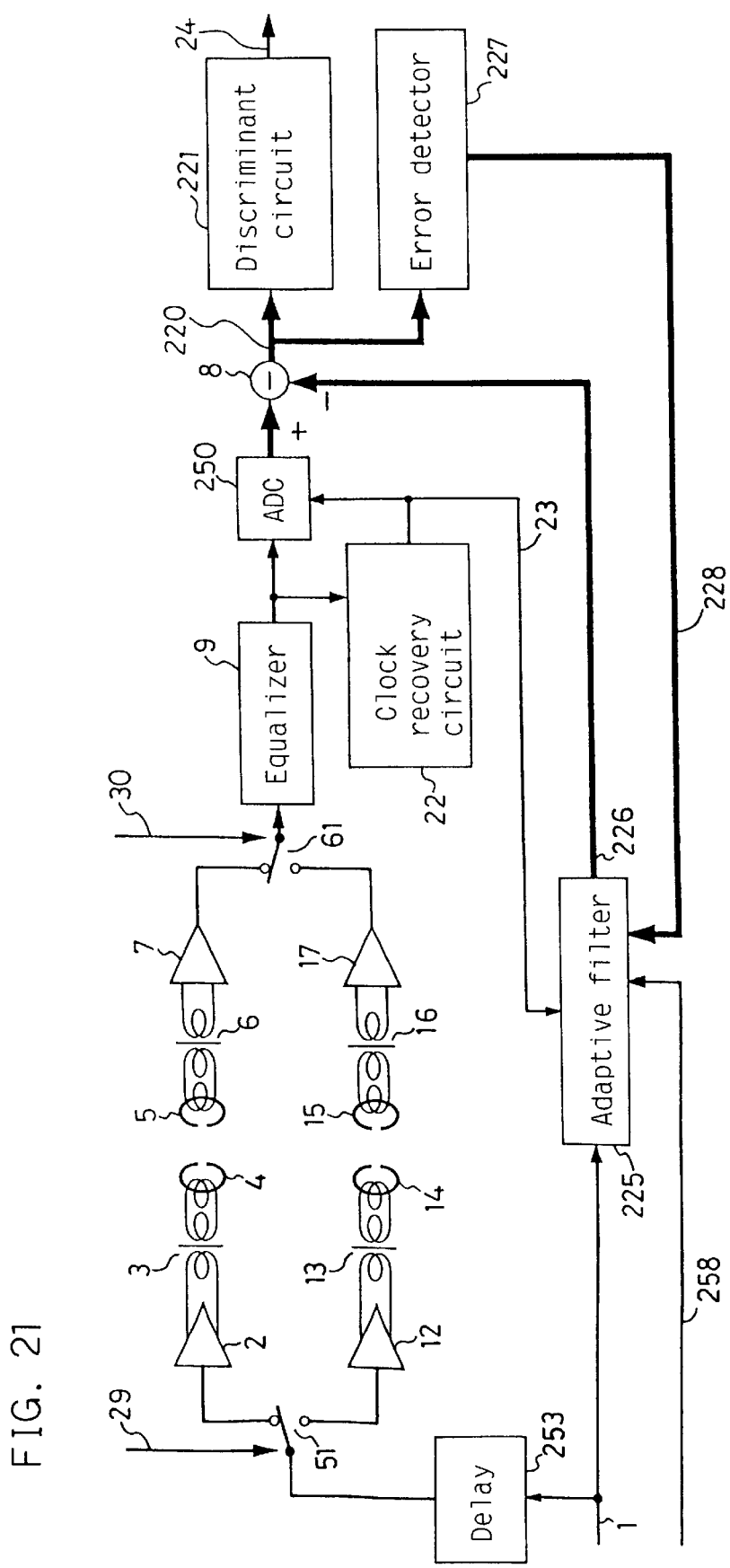
FIG. 21 is a block diagram showing the signal system in a magnetic recording and reproducing apparatus of Embodiment 6 of the present invention.

Next, a magnetic recording and reproducing apparatus which is Embodiment 6 of the recording and reproducing apparatus of the present invention will be mentioned with reference to accompanying FIG. 21. FIG. 21 is a diagram showing the signal system in the magnetic recording and reproducing apparatus of Embodiment 6. Portions having the same function as those of the magnetic recording and reproducing apparatuses of the above-mentioned Embodiment 5 are designated by the same reference numerals, and their description is omitted. In FIG. 21, signal lines of a thick line indicate digital signals which are expressed by plural bits, and those of a thin line indicate analog signals or digital signals which are expressed by one bit.

In the same manner as Embodiment 5, the magnetic recording and reproducing apparatus of Embodiment 6 comprises a pair of recording heads and a pair of reproducing heads which are mounted on a small rotary cylinder as shown in FIGS. 1 and 2, and digital data are recorded onto and reproduced from a magnetic tape which is slantly wound on the rotary cylinder and travels thereon. The apparatus of Embodiment 6 is different from Embodiment 5 only in the signal system. In the following, description on the signal system only will be done.

Referring to FIG. 21, the embodiment is different from Embodiment 5 only in that a delay circuit 253 which delays the recording data 1 by 4 periods of the recording clock signal and the signal which has been delayed by the delay circuit 253 is supplied to the recording changeover switch 51 so as to be used as a recording signal.

In Embodiment 5, as seen from the timing chart of FIG. 20, there occurs a delay in the operation of outputting the recording data 1 of (b) as the signal 255a of (t). At the timing when the recording data 1 of (b) is "P," for example, "L" is output as the signal 255a of (t) or a delay corresponding to 4 bits is done. Consequently, the recording data 1 of the 4 bits do not exert influence on the pseudo crosstalk signal 226 output from the adaptive filter 225.

In Embodiment 6 shown in FIG. 21, therefore, a signal which is obtained by delaying the recording data 1 by 4 periods of the recording clock signal by the delay circuit 253 is supplied to the recording heads. This causes data which have not yet been sent to the recording heads to be previously supplied to the adaptive filter 225. Therefore, the recording data 1 exerts influence on the pseudo crosstalk signal 226 output from the adaptive filter 225 while the delay time due to the processing does not affect the pseudo crosstalk signal 226.

In the magnetic recording and reproducing apparatus of Embodiment 6, it is possible to conduct simultaneous reproduction in which crosstalk can be canceled more correctly without being affected by the delay time due to the processing.

In the above, embodiments in which the heads are mounted on the rotary cylinder have been mentioned. The present invention is not restricted to this. The present invention may be applied to a tape recording apparatus using a fixed head or a recording and reproducing apparatus in which data are recorded onto a rotary medium such as a hard disk.

According to the present invention, even in an apparatus in which sufficient electromagnetic separation between recording and reproduced signals is hardly conducted, such as a small broadcasting VCR wherein the size of a rotary cylinder unit is largely reduced, it is possible to realize a simultaneous reproducing function in which crosstalk components leaking from the recording signal into the reproduced signal are reduced in level.

According to the present invention, even when the condition of crosstalk is changed in accordance with the rotation phase of the rotary cylinder or by changes in properties due to changes in temperature or with ages of the heads and electrical parts, simultaneous reproduction can be always conducted under the best conditions by adaptively reducing crosstalk components.

According to the present invention, even when the phase relationship between recording data and reproduced data is varied by rotation variation of a rotary cylinder or the like, simultaneous reproduction can be conducted without being affected by such variation.

The magnetic recording and reproducing apparatus of above embodiments are examples in which the heads are mounted on the rotary cylinder. The present invention is not restricted to those examples. The present invention may be applied to a tape recording apparatus using a fixed head or a recording and reproducing apparatus in which data are recorded onto a rotary medium such as a hard disk.

Although the present invention has been mentioned in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

I claim:

1. A recording and reproducing apparatus comprising:
   a recording head which records a recording signal onto a magnetic recording medium;
   a reproducing head which reproduces a recorded signal;
   adaptive filter for receiving the recording signal and outputting a pseudo crosstalk signal;
   operating means for subtracting the pseudo crosstalk signal of said adaptive filter from the signal reproduced by said reproducing head; and
   error detecting means for detecting an error signal in accordance with an output signal of said operating means and feeding back the error signal to said adaptive filter.

2. A recording and reproducing apparatus according to claim 1, wherein said error detecting means comprises:
   discriminator for discriminating codes of the reproduced signal; and
   operating means for outputting a difference between a reference value corresponding to a discrimination result of said discriminator, and the reproduced signal as the error signal.

3. A recording and reproducing apparatus according to claim 1, wherein said adaptive filter comprises:
   plural delaying means for delaying the recording signal by a predetermined time period;
   first multiplying means comprising plural multipliers which respectively receive outputs of said plural delaying means as one input, and which receive the error signal as another input;
   plural integrating means for respectively integrating output signals of said plural multipliers of said first multiplying means;
   second multiplying means comprising plural multipliers which respectively receive outputs of said plural delaying means as one input, and which respectively receive outputs of said plural integrating means as another input; and
   operating means for outputting a total sum of outputs of said multipliers of said second multiplying means, as an output of said adaptive filter.

4. A recording and reproducing apparatus comprising:
   an N number of or N sets of recording heads which record recording signals of N systems (N is an integer which is not smaller than 2) onto a magnetic recording medium; and
   an N number of or N sets of reproducing heads which reproduce a recorded signal,
   wherein said apparatus further comprises for each of said N number of or N sets of reproducing heads:
   an N number of adaptive filter which respectively receive the recording signals of N systems;
   operating means for subtracting outputs of said N number of adaptive filter from a signal reproduced by corresponding one or one set of reproducing heads; and
   error detecting means for detecting an error signal from an output signal of said operating means and feeding back the error signal to said adaptive filter.

5. A recording and reproducing apparatus according to claim 4, wherein said error detecting means further comprises:
   discriminator for discriminating codes of the reproduced signal; and
   operating means for outputting a difference between a reference value corresponding to a discrimination result of said discriminator, and the reproduced signal as the error signal.

6. A recording and reproducing apparatus according to claim 4, wherein said adaptive filter comprises:

plural delaying means for delaying the recording signal by a predetermined time period;

first multiplying means comprising plural multipliers which respectively receive outputs of said plural delaying means as one input, and receive the error signal as another input;

plural integrating means for respectively integrating output signals of said plural multipliers of said first multiplying means;

second multiplying means comprising plural multipliers which respectively receive outputs of said plural delaying means as one input, and which respectively receive outputs of said plural integrating means as another input; and operating means for outputting a total sum of outputs of said multipliers of said second multiplying means, as an output of said adaptive filter.

7. A recording and reproducing apparatus in which a reproducing operation is conducted simultaneously with a recording operation and which comprises:

a recording head which records a recording data onto a magnetic recording medium;

a reproducing head which reproduces a recorded signal;

adaptive filter for receiving the recording signal;

operating means for subtracting an output of said adaptive filter from the signal reproduced by said reproducing head;

error detecting means for detecting an error signal from an output signal of said operating means, and feeding back the error signal to said adaptive filter; and recovered clock signal generating means for generating a recovered clock signal from the reproduced signal, the recovered clock signal being synchronized with reproduced data, said adaptive filter comprising:

signal arranging means for outputting K number of continuous recording data (K is a natural number) from a recording data stream as a first data group in synchronization with the recovered clock signal, and outputting K number of other continuous recording data from the recording data stream as a second data group in synchronization with the recovered clock signal;

a first group of multiplying means consisting of K number of multiplying means, said first group of multiplying means receiving K number of data of the second data group as one input, and the error signal as another input;

K number of integrating means for integrating each of output signals of said K number of multiplying means of said first group of multiplying means;

a second group of multiplying means consisting of K number of multiplying means, said second group of multiplying means receiving K number of data of the first data group as one input, and outputs of said K number of integrating means as another input; and operating means for calculating a total sum of outputs of said K number of multiplying means of said second group of multiplying means, and outputting the total sum as an output of said adaptive filter.

8. A recording and reproducing apparatus according to claim 7, wherein said error detecting means comprises: discriminator for discriminating codes from the reproduced signal; and operating means for outputting a difference between a reference value corresponding to a discrimination result of said discriminator, and the reproduced signal as the error signal.

9. A recording and reproducing apparatus according to claim 7, wherein said signal arranging means comprises: clock phase detecting means for detecting a change of a phase relationship between the recovered clock signal and a recording clock signal synchronized with the recording data; and rearranging means for changing a signal arrangement of the K number of recorded data of each of the first and second data groups in accordance with a detection result of said clock phase detecting means.

10. A recording and reproducing apparatus according to claim 7, wherein said apparatus further comprises delaying means for supplying the recording data to said recording head with delaying the recording data by a predetermined time period.

11. A recording and reproducing apparatus according to claim 9, wherein said clock phase detecting means comprises: frequency dividing means for dividing a frequency of the recording clock signal and outputting a divided phase; latching means for sampling an output of said frequency dividing means by means of the recovered clock signal; delaying means for delaying an output of said latching means by one period of the recovered clock signal; and phase change detecting means for detecting a change of a phase relationship between the recording clock signal and the recovered clock signal from the output of said latching means and an output of said delaying means.

12. A recording and reproducing apparatus according to claim 9, wherein said rearranging means changes a signal arrangement so that, when the K number of data outputs of the first data group of said signal arranging means are indicated by $\{q[0], q[1], \ldots, q[K-1]\}$, the recording data at time n of the recording clock signal is indicated by $r[n]$, and it is assumed that, when $r[n-h-i]$ with $q[\mod(i+j)]$ ($i=0, 1, \ldots, K-1$, j and h are integers, and $\mod(A)$ indicates a remainder in the case where an integer A is divided by K) is output, $r[n-h-i]$ with $q[\mod(i+j+1)]$ is output when the time of the recording clock signal is n at time m+1 of the recovered clock signal, $r[n-h-i+1]$ with $q[\mod(i+j)]$ is output when the time of the recording clock signal is n+1 at time m+1 of the recovered clock signal, and $r[n-h-i+23]$ with $q[\mod(i+j-1)]$ is output when the time of the recording clock signal is n+2at time m+1 of the recovered clock signal.

13. A recording and reproducing apparatus according to claim 11, wherein said frequency dividing means converts the divided phase obtained by dividing the frequency of the recording clock signal into a Gray code and then outputs the divided phase.

* * * * *